(12) United States Patent
Takagi et al.

(10) Patent No.: US 8,089,041 B2
(45) Date of Patent: Jan. 3, 2012

(54) ILLUMINATION DEVICE, IMAGE DISPLAY DEVICE, AND PROJECTOR

(75) Inventors: Masayuki Takagi, Shiojiri (JP); Takashi Takeda, Suwa (JP); Taisuke Yamauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 274 days.

(21) Appl. No.: 12/345,158

(22) Filed: Dec. 29, 2008

(65) Prior Publication Data

US 2009/0174943 A1    Jul. 9, 2009

(30) Foreign Application Priority Data

Jan. 7, 2008   (JP) .................................. 2008-000372

(51) Int. Cl.
G01D 5/36 (2006.01)
G02F 1/11 (2006.01)
(52) U.S. Cl. ..................................... 250/237 G; 359/285
(58) Field of Classification Search .................... 353/31, 353/122, 20, 33, 81, 82, 84, 101; 359/337.21, 359/12, 17, 285, 290, 305; 250/237 R, 237 G; 385/10, 36, 37
See application file for complete search history.

(56) References Cited

U.S. PATENT DOCUMENTS

| | | | | |
|---|---|---|---|---|
| 3,894,182 | A * | 7/1975 | Yamamoto et al. | 348/203 |
| 7,174,068 | B2 * | 2/2007 | Kim et al. | 385/33 |
| 7,583,875 | B2 * | 9/2009 | Yamauchi et al. | 385/37 |

FOREIGN PATENT DOCUMENTS

| | | |
|---|---|---|
| JP | A 2007-33576 | 2/2007 |
| JP | A 2007-33578 | 2/2007 |
| JP | A 2007-52226 | 3/2007 |
| JP | A 2007-58148 | 3/2007 |

* cited by examiner

*Primary Examiner* — Georgia Y Epps
*Assistant Examiner* — Don Williams
(74) *Attorney, Agent, or Firm* — Oliff & Berridge, PLC

(57) ABSTRACT

An illumination device includes: a light source unit that emits coherent light; and a diffractive optical element that diffracts the coherent light emitted from the light source unit and makes the diffracted light travel to an illuminated surface. The diffractive optical element is disposed such that the coherent light is incident in a state of being inclined with respect to a perpendicular line of a reference plane on which the diffractive optical element is disposed. Zero-order light, which is light other than the diffracted light, of light components emitted from the diffractive optical element travels to a position other than the illuminated surface.

16 Claims, 18 Drawing Sheets

ILLUMINATION DEVICE, IMAGE DISPLAY DEVICE, AND PROJECTOR

BACKGROUND

1. Technical Field

The present invention relates to an illumination device, an image display device, and a projector and in particular, to a technique of an illumination device using a laser light source.

2. Related Art

In recent years, a technique of using a laser light source as an illumination device of a projector has been proposed. For example, a diffractive optical element may be used as an overlapping unit that makes laser beams overlap on an illuminated surface. The diffractive optical element performs shaping and enlargement of an illuminated region and makes the light intensity distribution in the illuminated region uniform by diffracting a laser beam which is coherent light. By realizing a plurality of functions with the diffractive optical element, the illumination device can be made with a small number of components. As a result, it becomes easy to make the illumination device small and to save the space. When zero-order light and diffracted light from the diffractive optical element are incident on the illuminated surface, only a part of the illuminated region may become bright because the zero-order light and the diffracted light overlap each other. Since only a part of the illuminated region is bright, it becomes difficult to obtain good light intensity distribution. In order to solve the problem, the zero-order light is made to travel to a position other than the illuminated surface. As a result, it becomes easy to make the light intensity distribution in the illuminated region uniform. For example, a technique of providing an illuminated surface at a position other than a position on an extending line of a beam line of a laser beam emitted from a light source unit is proposed in JP-A-2007-58148. Zero-order light emitted from a diffractive optical element travels on the extending line of the beam line of the laser beam emitted from the light source unit and moves to the position other than the illuminated surface.

In the technique disclosed in JP-A-2007-58148, a principal beam of diffracted light emitted from the diffractive optical element is largely inclined with respect to a perpendicular line of a reference plane on which the diffractive optical element is disposed. Advanced design technology is required for the diffractive optical element in order to realize shaping of an illuminated region and uniform light intensity distribution for diffracted light whose principal beam is largely inclined with respect to the perpendicular line of the reference plane. For this reason, a problem that shaping of the illuminated region and making the light intensity distribution uniform may be difficult occurs in the related art.

SUMMARY

An advantage of some aspects of the invention is that it provides an illumination device capable of easily realizing shaping of an illuminated region and uniform light intensity distribution, an image display device using the illumination device, and a projector.

In order to solve the above problems, according to an aspect of the invention, an illumination device includes: a light source unit that emits coherent light; and a diffractive optical element that diffracts the coherent light emitted from the light source unit and makes the diffracted light travel to an illuminated surface. The diffractive optical element is disposed such that the coherent light is incident in a state of being inclined with respect to a perpendicular line of a reference plane on which the diffractive optical element is disposed. Zero-order light, which is light other than the diffracted light, of light components emitted from the diffractive optical element travels to a position other than the illuminated surface.

The zero-order light emitted from the diffractive optical element travels in a direction inclined with respect to the perpendicular line of the reference plane. By making the zero-order light travel in the direction inclined with respect to the perpendicular line of the reference plane, an angle formed by the perpendicular line of the reference plane and the principal beam of the diffracted light can be made small. The diffractive optical element capable of realizing shaping of the illuminated region and uniform light intensity distribution can be easily designed in proportion to a decrease in the inclination of the principal beam of the diffracted light with respect to the perpendicular line of the reference plane. As a result, the illumination device capable of realizing shaping of the illuminated region and uniform light intensity distribution can be easily obtained.

Furthermore, in the illumination device according to the aspect of the invention, preferably, when the illuminated surface is moved in a direction parallel to an optical axis of an illumination optical system that forms the illumination device, at least a part of the diffractive optical element is included in a predetermined region assuming that a space region formed by the locus of the illuminated surface is the predetermined region. When a part of the diffractive optical element is included in the predetermined region, an apparatus using an illumination device can be made compact compared with a case where a diffractive optical element is disposed at the position distant from the predetermined region. In addition, the principal beam of the diffracted light emitted from the diffractive optical element can be made as vertical as possible with respect to the illuminated surface.

Furthermore, in the illumination device according to the aspect of the invention, it is preferable that the reference plane be approximately perpendicular to the optical axis. In this case, since the angle formed by the perpendicular line of the reference plane and the principal beam of the diffracted light can be made smallest, shaping of the illuminated region and making the light intensity distribution uniform can be easiest. In addition, the principal beam of the diffracted light can be made to be most vertical with respect to the illuminated surface.

Furthermore, in the illumination device according to the aspect of the invention, it is preferable to further include a collimating lens that collimates the diffracted light components from the diffractive optical element to travel to the illuminated surface. It becomes possible to use a central portion of a spherical lens with approximately the same shape as a part of a spherical surface in proportion to a decrease in the inclination of the principal beam of the diffracted light with respect to the perpendicular line of the reference plane. By making it possible to use the central portion of the spherical lens, an influence of the aberration of the spherical lens can be reduced compared with a case where a portion near the outer edge of the spherical lens is used. The brightness unevenness of the illuminated region or lowering of the light use efficiency caused by distortion of the illuminated region may be decreased by reducing the influence of the aberration. Thus, the brightness unevenness and the lowering of the light use efficiency can be reduced by using a spherical lens which can be manufactured easily compared with an aspheric lens.

Furthermore, in the illumination device according to the aspect of the invention, preferably, assuming that a specific direction along the illuminated surface is a first direction and a direction along the illuminated surface and approximately perpendicular to the first direction is a second direction, an illuminated region, which is a region on which the diffracted light is incident, of the illuminated surface forms a shape longer in the second direction than in the first direction, and a principal beam of the coherent light incident on the diffractive optical element is inclined in the first direction with respect to the perpendicular line. In this case, an angle formed by a beam line of the zero-order light and the principal beam of the diffracted light can be made as small as possible. Since the diffraction efficiency in the diffractive optical element can be improved in proportion to a decrease in the angle formed by the beam line of the zero-order light and the principal beam of the diffracted light, the high light use efficiency can be realized.

Furthermore, in the illumination device according to the aspect of the invention, it is preferable to further include a plurality of the light source units. Bright light can be supplied by using the plurality of light source units.

Furthermore, in the illumination device according to the aspect of the invention, preferably, the plurality of light source units make the coherent light travel approximately symmetrically with respect to an optical axis of an illumination optical system that forms the illumination device or a plane including the optical axis. In this case, each zero-order light component can be made to travel to the position other than the illuminated surface, and the angle formed by the beam line of the zero-order light and the principal beam of the diffracted light can be made small.

Furthermore, in the illumination device according to the aspect of the invention, preferably, principal beams of the coherent light emitted from the light source units are closest in an optical path between the light source units and the diffractive optical element. By making coherent light converging between the light source units and the diffractive optical element incident on the diffractive optical element, it becomes possible to use the diffractive optical element with a small incidence surface compared with a case where coherent light diverging from each light source unit is incident on the diffractive optical element. In this case, since the diffractive optical element can be made small, manufacturing time and cost of the diffractive optical element can be reduced.

Furthermore, in the illumination device according to the aspect of the invention, preferably, principal beams of the zero-order light emitted from the diffractive optical element are closest in an optical path between the diffractive optical element and the illuminated surface. Also in this case, since the diffractive optical element can be made small, the manufacturing time and cost of the diffractive optical element can be reduced. In addition, since the distance between the light source units and the diffractive optical element can be shortened, the illumination device can also be made small.

Furthermore, in the illumination device according to the aspect of the invention, it is preferable to further include a deflection element that deflects the coherent light emitted from the light source unit and makes the deflected light incident on the diffractive optical element. In this case, the coherent light traveling in a state of being inclined with respect to the perpendicular line of the reference plane can be incident on the diffractive optical element. By appropriately deflecting a laser beam using the deflection element, the light source units can be disposed with high degree of freedom.

Furthermore, in the illumination device according to the aspect of the invention, it is preferable that the deflection element refract the coherent light. In this case, the coherent light can be deflected.

Furthermore, in the illumination device according to the aspect of the invention, it is preferable that the deflection element diffract the coherent light. In this case, the coherent light can be deflected.

Furthermore, in the illumination device according to the aspect of the invention, it is preferable that the deflection element and the diffractive optical element be integrally formed. In this case, since the number of components of the illumination device can be reduced, the illumination device can be made simple and compact.

In addition, according to another aspect of the invention, there is provided an image display device that displays an image using light supplied from the illumination device described above. By using the above-described illumination device, good light intensity distribution and high light use efficiency can be obtained by the compact configuration. As a result, by the compact configuration, the image display device capable of displaying a bright image with good light intensity distribution can be obtained.

In addition, according to still another aspect of the invention, there is provided a projector including: the illumination device described above; a spatial light modulation device that modulates light supplied from the illumination device according to an image signal; and a projection optical system that projects light emitted from the spatial light modulation device. By using the above-described illumination device, good light intensity distribution and high light use efficiency can be obtained by the compact configuration. As a result, by the compact configuration, the projector capable of displaying a bright image with good light intensity distribution can be obtained. Since an angle of a light beam incident on the spatial light modulation device can be suppressed small, a high-contrast image may also be displayed.

BRIEF DESCRIPTION OF THE DRAWINGS

The invention will be described with reference to the accompanying drawings, wherein like numbers reference like elements.

FIG. 5 is a side view schematically illustrating the configuration of a known illumination device and the like.

DESCRIPTION OF EXEMPLARY EMBODIMENTS

Hereinafter, embodiments of the invention will be described in detail with reference to the accompanying drawings.

First Embodiment

Figure 1:
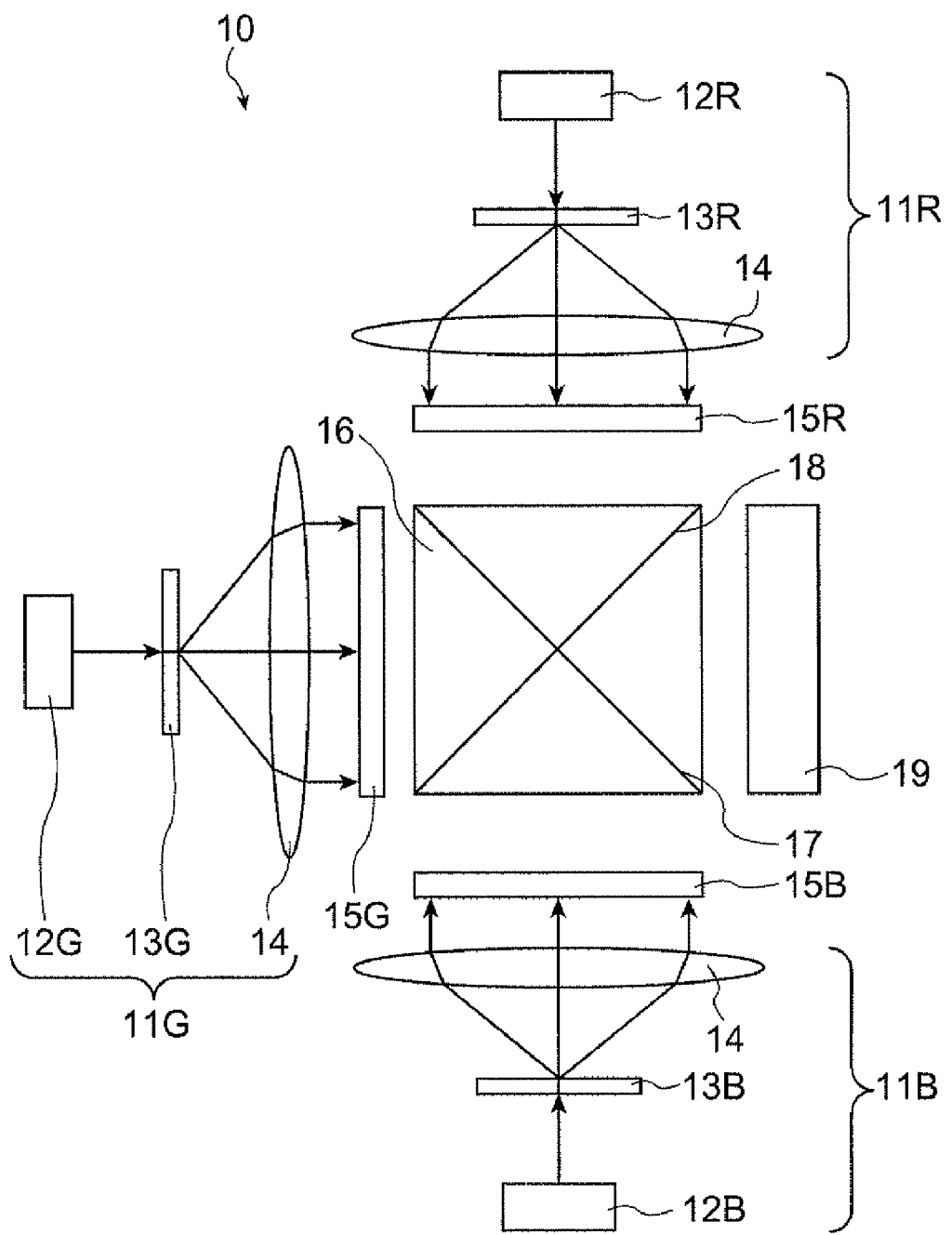
FIG. 1 is a top view schematically illustrating the configuration of a projector according to a first embodiment of the invention.

FIG. 1 is a top view schematically illustrating the configuration of a projector 10 according to a first embodiment of the invention. The projector 10 is a front projection type projector that projects light onto a screen (not shown) and makes the light reflected from the screen observed so that a viewer enjoys an image. The projector 10 has a first illumination device 11R, a second illumination device 11G, and a third illumination device 11B. The first illumination device 11R is an illumination device that supplies red (R) light, which is a first color light component. The second illumination device 11G is an illumination device that supplies green (G) light, which is a second color light component. The third illumination device 11B is an illumination device that supplies blue (B) light, which is a third color light component. The projector 10 is an image display device that displays an image using R light supplied from the first illumination device 11R, G light supplied from the second illumination device 11G, and B light supplied from the third illumination device 11B.

The first illumination device 11R has a laser light source 12R that emits R light. The laser light source 12R is a light source unit that emits a laser beam, which is coherent light. For example, the laser light source 12R includes a semiconductor laser. A diffractive optical element 13R makes the R light from the laser light source 12R diffract and makes the diffracted light travel to an illuminated surface of a first spatial light modulation device 15R. The diffractive optical element 13R forms an illuminated region, which has a rectangular shape and in which the light intensity distribution is uniform, on the illuminated surface of the first spatial light modulation device 15R. The diffractive optical element 13R performs shaping and enlargement of the illuminated region and makes the light intensity distribution in the illuminated region uniform. A collimating lens 14 collimates the diffracted light beams from the diffractive optical element 13R and makes the collimated beams travel to the illuminated surface. The first spatial light modulation device 15R is a spatial light modulation device, which modulates the R light supplied from the first illumination device 11R according to an image signal, and is a transmissive liquid crystal display device. The R light from the first spatial light modulation device 15R is incident on a cross dichroic prism 16.

The second illumination device 11G has a laser light source 12G that emits G light. The laser light source 12G is a light source unit that emits a laser beam, which is coherent light. For example, the laser light source 12G includes a semiconductor laser. A diffractive optical element 13G makes the G light from the laser light source 12G diffract and makes the diffracted light travel to an illuminated surface of a second spatial light modulation device 15G. The diffractive optical element 13G forms an illuminated region, which has a rectangular shape and in which the light intensity distribution is uniform, on the illuminated surface of the second spatial light modulation device 15G. The diffractive optical element 13G performs shaping and enlargement of the illuminated region and makes the light intensity distribution in the illuminated region uniform. The collimating lens 14 collimates the diffracted light beams from the diffractive optical element 13G and makes the collimated beams travel to the illuminated surface. The second spatial light modulation device 15G is a spatial light modulation device, which modulates the G light supplied from the second illumination device 11G according to an image signal, and is a transmissive liquid crystal display device. The G light from the second spatial light modulation device 15G is incident on a surface of the cross dichroic prism 16 different from the surface on which the R light is incident.

The third illumination device 11B has a laser light source 12B that emits B light. The laser light source 12B is a light source unit that emits a laser beam, which is coherent light. For example, the laser light source 12B includes a semiconductor laser. A diffractive optical element 13B makes the B light from the laser light source 12B diffract and makes the diffracted light travel to an illuminated surface of a third spatial light modulation device 15B. The diffractive optical element 13B forms an illuminated region, which has a rectangular shape and in which the light intensity distribution is uniform, on the illuminated surface of the third spatial light modulation device 15B. The diffractive optical element 13B performs shaping and enlargement of the illuminated region and makes the light intensity distribution in the illuminated region uniform. The collimating lens 14 collimates the diffracted light beams from the diffractive optical element 13B and makes the collimated beams travel to the illuminated surface. The third spatial light modulation device 15B is a spatial light modulation device, which modulates the B light supplied from the third illumination device 11B according to an image signal, and is a transmissive liquid crystal display device. The B light from the third spatial light modulation device 15B is incident on a surface of the cross dichroic prism 16 different from the surface on which the R light is incident and the surface on which the G light is incident.

As the diffractive optical elements 13R, 13G, and 13B, for example, a computer generated hologram (CGH) may be used. As a transmissive liquid crystal display device, for example, a high temperature polysilicon (HTPS) TFT liquid crystal panel may be used.

The cross dichroic prism 16 has two dichroic films 17 and 18 disposed to approximately cross each other. The first dichroic film 17 makes R light reflected therefrom and G and B light transmitted therethrough. The second dichroic film 18 makes the B light reflected therefrom and the R and G light transmitted therethrough. The cross dichroic prism 16 mixes the R, G, and B light incident from different directions and then emits the mixed light in the direction of a projection lens 19. The projection lens 19 functions as a projection optical system that projects the light emitted from each of the spatial light modulation devices 15R, 15G, and 15B.

Figure 2:
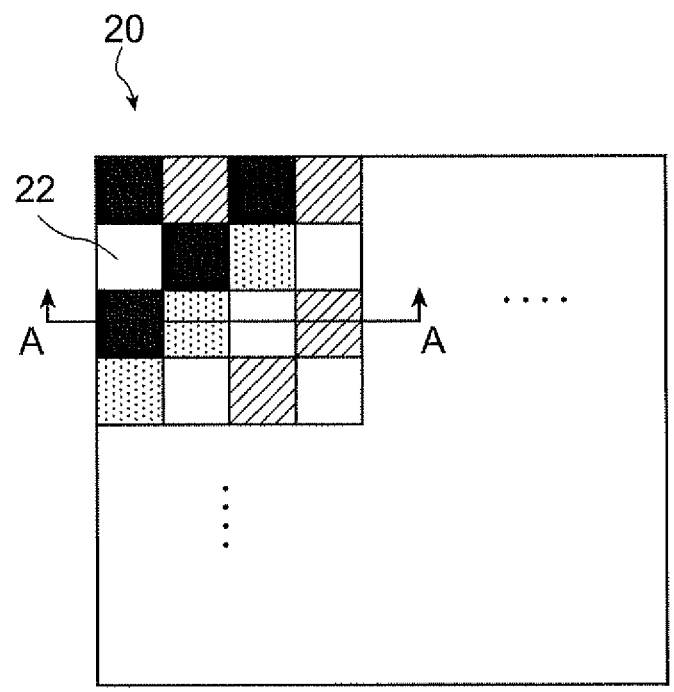
FIG. 2 is a view schematically illustrating a diffraction grating formed on a diffractive optical element.
Figure 3:
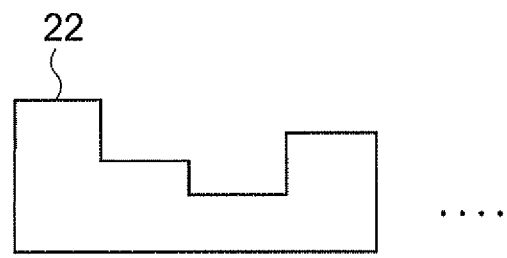
FIG. 3 is a cross-sectional view illustrating the configuration of a part of the diffraction grating.

FIG. 2 is a view schematically illustrating a diffraction grating 20 formed on each of the diffractive optical elements 13R, 13G, and 13B. FIG. 3 is a cross-sectional view taken along the line A-A of FIG. 2. The diffraction grating 20 is formed at the position of each of the diffractive optical elements 13R, 13G, and 13B on which a laser beam is incident. The diffraction grating 20 is formed on a surface of each of the diffractive optical elements 13R, 13G, and 13B, for example, an emission surface from which light is emitted. The diffraction grating 20 has a plurality of irregularities formed by using a rectangular region 22 as a unit. The irregularities have rectangular shapes on the cross section shown in FIG. 3. In FIG. 2, a height difference in a direction perpendicular to the plane of the drawing is expressed by painting out or hatching each rectangular region 22, for example.

The diffraction grating 20 changes the phase of a laser beam for every rectangular region 22. Each of the diffractive optical elements 13R, 13G, and 13B generates diffracted light by spatially changing the phase of a laser beam at the diffraction grating 20. The diffractive optical elements 13R, 13G, and 13B can be made to have predetermined functions by optimizing surface conditions including a pitch between the rectangular regions 22 and heights of the irregularities. A predetermined operation method (simulation method), such as repeated Fourier transform, may be used as a design method of optimizing the surface conditions of the diffraction grating 20. In addition to the diffraction grating 20 with irregularities having rectangular shapes on the cross section, a diffraction grating with irregularities having triangular shapes on the cross section may also be provided in each of the diffractive optical elements 13R, 13G, and 13B.

For example, the diffractive optical elements 13R, 13G, and 13B may be manufactured by using a so-called nanoimprint method of forming a mold with a desired shape and transferring the shape of the mold onto a substrate by heat. In addition, the diffractive optical elements 13R, 13G, and 13B may also be manufactured by using other methods used in the related art as long as a desired shape can be formed.

Figure 4:
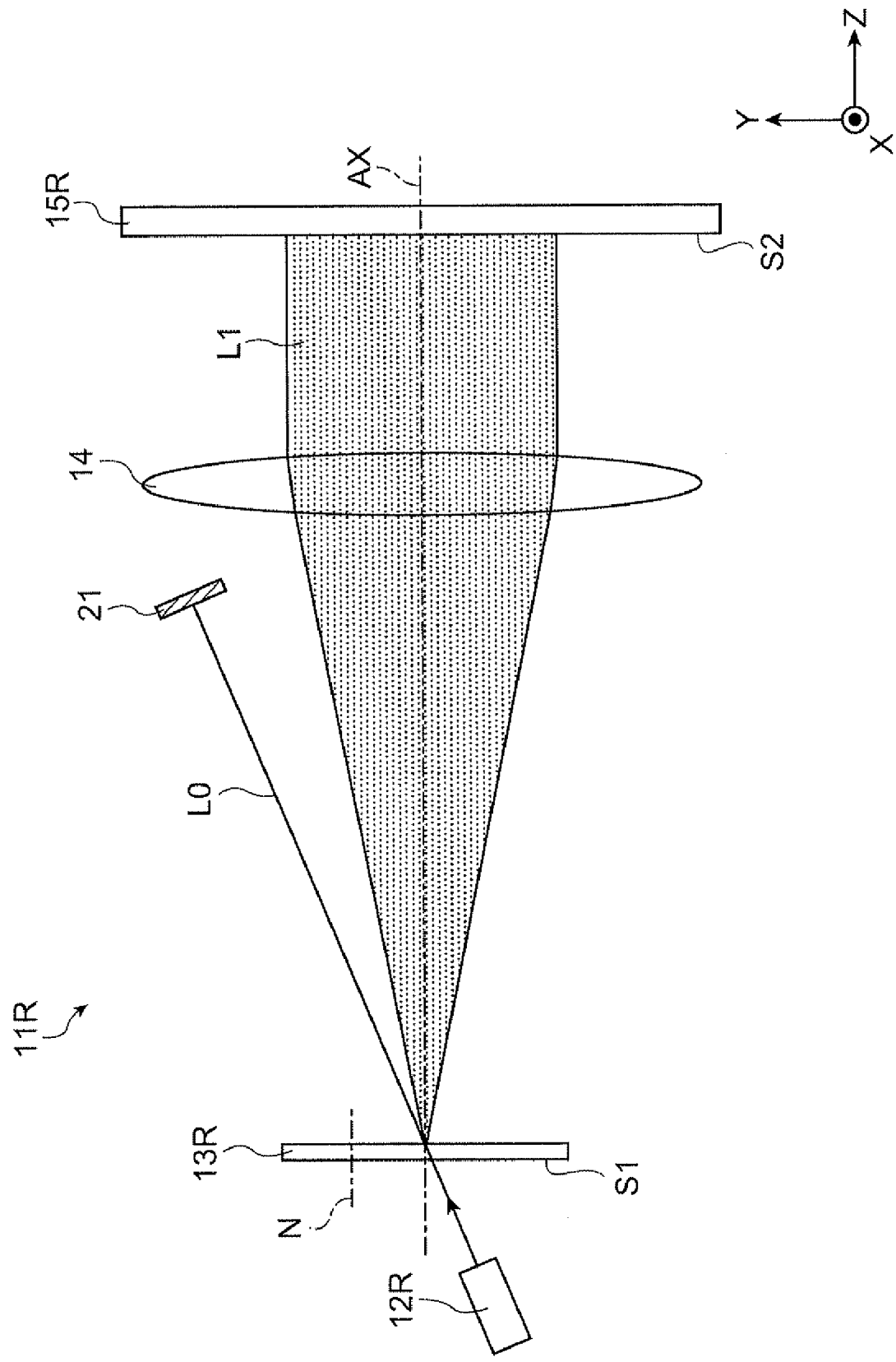
FIG. 4 is a side view schematically illustrating the configuration of a first illumination device.

FIG. 4 is a side view schematically illustrating the configuration of the first illumination device 11R. The first illumination device 11R, the second illumination device 11G, and the third illumination device 11B have the same construction except that the wavelengths of light beams supplied and the directions disposed are different. Hereinafter, the configuration of the first illumination device 11R will be described as a representative example. The diffractive optical element 13R, the collimating lens 14, and the first spatial light modulation device 15R are provided on the optical axis AX of an illumination optical system that forms the first illumination device 11R. The optical axis AX is assumed to be a line that passes through the center of the illuminated region of the first spatial light modulation device 11R and is perpendicular to the illuminated surface. A main axis of the collimating lens 14 matches the optical axis AX. An axis parallel to the optical axis AX is assumed to be a Z axis. An X axis is an axis perpendicular to the Z axis. A Y axis is an axis perpendicular to the Z and X axes.

Both an incidence surface S1 of the diffractive optical element 13R and an illuminated surface S2 of the first spatial light modulation device 15R are approximately perpendicular to the optical axis AX. Both the incidence surface S1 and the illuminated surface S2 are approximately parallel to the X and Y axes. The incidence surface S1 of the diffractive optical element 13R is assumed to be a reference plane on which the diffractive optical element 13R is disposed. A perpendicular line N of the incidence surface S1 which is a reference plane of the diffractive optical element 13R is approximately parallel to the optical axis AX. The laser light source 12R makes laser beams travel in an inclined state with respect to the perpendicular line N such that a principal beam of the laser beams is inclined in the Y-axis direction with respect to the perpendicular line N. The diffractive optical element 13R is disposed such that the laser beam is incident in an inclined state with respect to the perpendicular line N.

The diffractive optical element 13R makes the laser beam emitted from the laser light source 12R diffract and makes first-order diffracted light L1 travel to the illuminated surface S2. The diffractive optical element 13R forms an illuminated region, which has a rectangular shape and in which the light intensity distribution is uniform, using the first-order diffracted light L1. The illuminated region is a region of the illuminated surface S2 on which the first-order diffracted light L1 is incident. The diffractive optical element 13R emits zero-order light L0 which is light other than the first-order diffracted light L1. The zero-order light L0 is light which does not diffract at the diffractive optical element 13R and is transmitted through the diffractive optical element 13R.

The first-order diffracted light L1 emitted from the diffractive optical element 13R extends with an optical axis AX as the center. A principal beam of the first-order diffracted light L1 emitted from the diffractive optical element 13R approximately matches the optical axis AX. The zero-order light L0 emitted from the diffractive optical element 13R travels on an extending line of a beam line of the laser beam emitted from the laser light source 12R and moves to the position other than the illuminated surface S2. By making the zero-order light L0 travel to the position other than the illuminated surface S2, occurrence of unevenness, such as a case where a part of the illuminated region becomes bright, is reduced. As a result, the light intensity distribution in the illuminated region becomes easily uniform.

A light absorbing portion 21 is provided at the position on which the zero-order light L0 emitted from the diffractive optical element 13R is incident. The zero-order light L0 emitted from the diffractive optical element 13R is absorbed into the light absorbing portion 21. The light absorbing portion 21 is formed by using a light absorbing resin member, for example. Stray light can be reduced by using the light absorbing portion 21.

Figure 5:
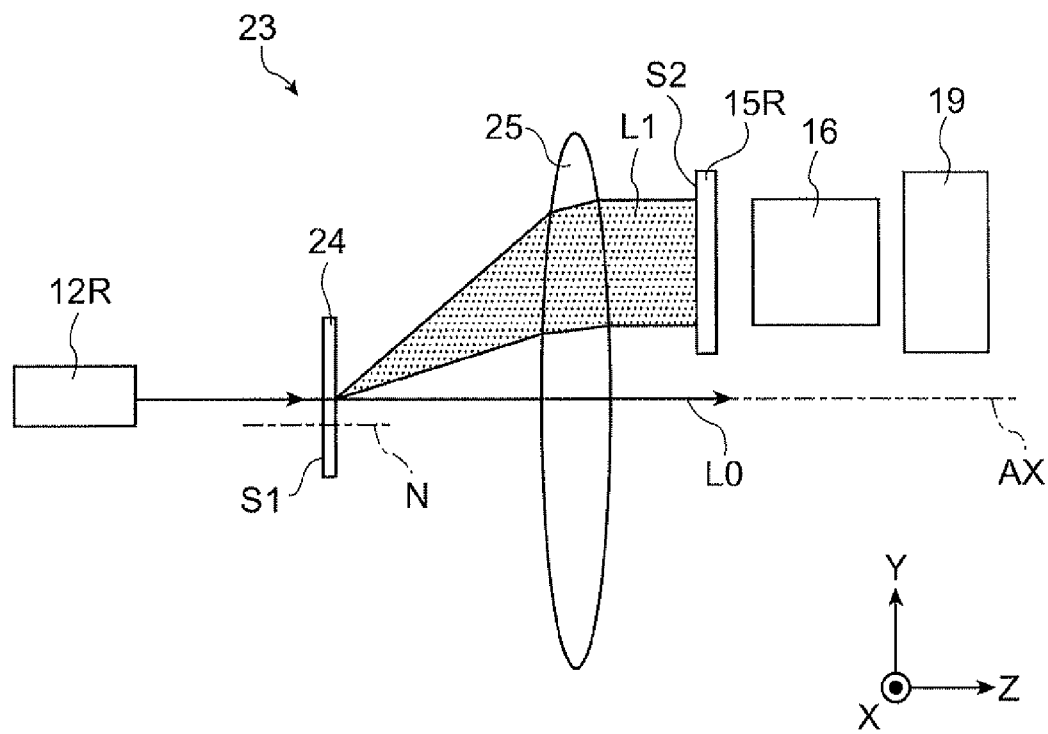

FIG. 5 is a side view schematically illustrating a known illumination device 23 in a comparative example according to the present embodiment and the configuration of each portion from the illumination device 23 to a projection lens 19. The illumination device 23 has a laser light source 12R, a diffractive optical element 24, and a collimating lens 25 provided on the same optical axis AX. The first spatial light modulation device 15R, the cross dichroic prism 16, and the projection lens 19 are provided at the positions moved in a specific direction, for example, Y-axis direction from the optical axis AX. The laser light source 12R makes a laser beam travel approximately in parallel to the perpendicular line N. The diffractive optical element 24 is disposed such that a laser beam is incident approximately in parallel to the perpendicular line N.

The zero-order light L0 emitted from the diffractive optical elements 24 travels approximately in parallel to the optical axis AX to move to the position other than the illuminated surface S2. The first-order diffracted light L1 emitted from the diffractive optical element 24 travels to the illuminated surface S2. Principal beams of the first-order diffracted light L1 emitted from the diffractive optical element 24 are inclined with respect to the optical axis AX. Advanced design technology is required for the diffractive optical element 24 in order to realize shaping of an illuminated region and uniform light intensity distribution for diffracted light whose principal beam is largely inclined with respect to the perpendicular line N. For this reason, shaping of the illuminated region and making the light intensity distribution uniform are difficult in the illumination device 23 in this comparative example.

In addition, the projector 10 is enlarged by adopting a configuration in which the first-order diffracted light L1 whose principal beam is inclined with respect to the optical axis AX is incident on the first spatial light modulation device 15R, compared with a case where the first spatial light modulation device 15R is disposed on the optical axis AX. The collimating lens 25 collimates the first-order diffracted light components L1 by using a portion near the outer edge.

Figure 6:
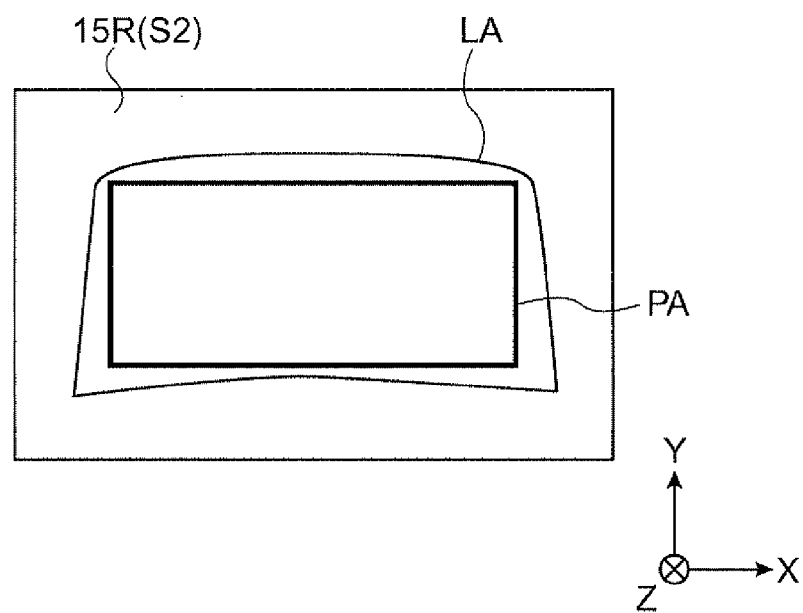
FIG. 6 is a view illustrating an illuminated region in a case of using a known illumination device.

FIG. 6 is a view illustrating an illuminated region LA in a case of using the known illumination device 23. For example, the collimating lens 25 is assumed to be a spherical lens with a spherical shape. For the spherical lens, an influence of the aberration of the spherical lens becomes noticeable as a portion used near the outer edge increases. For example, if an influence of distortion that shrinks an image becomes noticeable as the portion used near the outer edge of the spherical lens increases, the illuminated region LA is distorted with respect to a pixel region PA with a rectangular shape, as shown in the drawing. As deformation of the illuminated region LA from the rectangular shape increases, light lost due to being incident on the position other than the pixel region PA increases. As a result, the light use efficiency is reduced. In addition, the brightness unevenness of the illuminated region LA may occur due to the influence of the aberration. When the brightness unevenness, such as a case where the brightness increases as a distance from the optical axis AX increases, occurs on the illuminated surface S2, the light lost due to being incident on the position other than the pixel region PA further increases. When using an aspheric lens as the collimating lens 25 in order to reduce such an influence of the aberration, very difficult design for the aspheric lens is requested.

Referring back to FIG. 4, an angle formed by the perpendicular line N and the principal beam of the first-order diffracted light L1 can be made small by making the zero-order light L0 travel in a direction inclined with respect to the perpendicular line N. The diffractive optical element 13R capable of realizing shaping of an illuminated region and uniform light intensity distribution can be easily designed in proportion to a decrease in the inclination of a principal beam of the first-order diffracted light L1 with respect to the perpendicular line N. In the first illumination device 11R according to the present embodiment, shaping of an illuminated region and making the light intensity distribution uniform become easiest by approximately matching the perpendicular line N of the diffractive optical elements 13R with the principal beam of the first-order diffracted light L1. As described above, the effect that each of the illumination devices 11R, 11G, and 11B can easily realize shaping of the illuminated region and uniform light intensity distribution is obtained.

The projector 10 can have a compact configuration by allowing the first spatial light modulation device 15R to be disposed on the optical axis AX. By the compact configuration, the projector 10 can display a bright image with good light intensity distribution. In addition, the first-order diffracted light L1 may also be made to travel such that the first-order diffracted light L1 is as vertical as possible with respect to the illuminated surface S2. Since the angle of a beam line of the first-order diffracted light L1 incident on the first spatial light modulation device 15R can be suppressed small, a high-contrast image may also be displayed. By approximately matching the perpendicular line N with the principal beam of the first-order diffracted light L1, the collimating lens 14 collimates the first-order diffracted light components L1 by using a central portion with the optical axis AX as a center.

Figure 7:
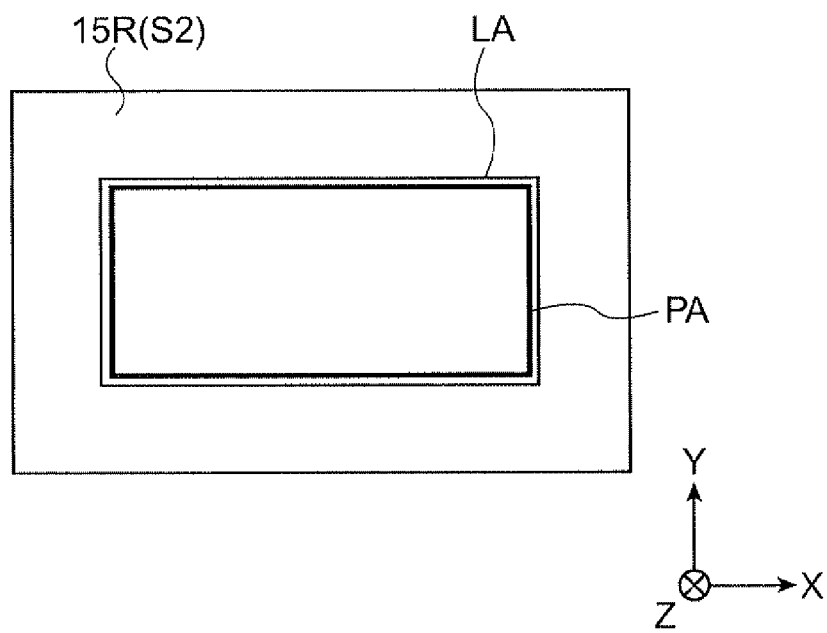
FIG. 7 is a view illustrating an illuminated region in a case of using the first illumination device.

FIG. 7 is a view illustrating the illuminated region LA when the first illumination device 11R according to the present embodiment is used. For example, the collimating lens 14 is assumed to be a spherical lens with a spherical shape. By making it possible to use a central portion of a spherical lens, the influence of the aberration of the spherical lens can be reduced compared with a case where a portion near the outer edge of the spherical lens is used. The brightness unevenness of the illuminated region LA or lowering of the light use efficiency caused by distortion may be decreased by reducing the influence of the aberration. Thus, the brightness unevenness and the lowering of the light use efficiency can be reduced by using a spherical lens which can be manufactured easily compared with an aspheric lens.

Figure 8:
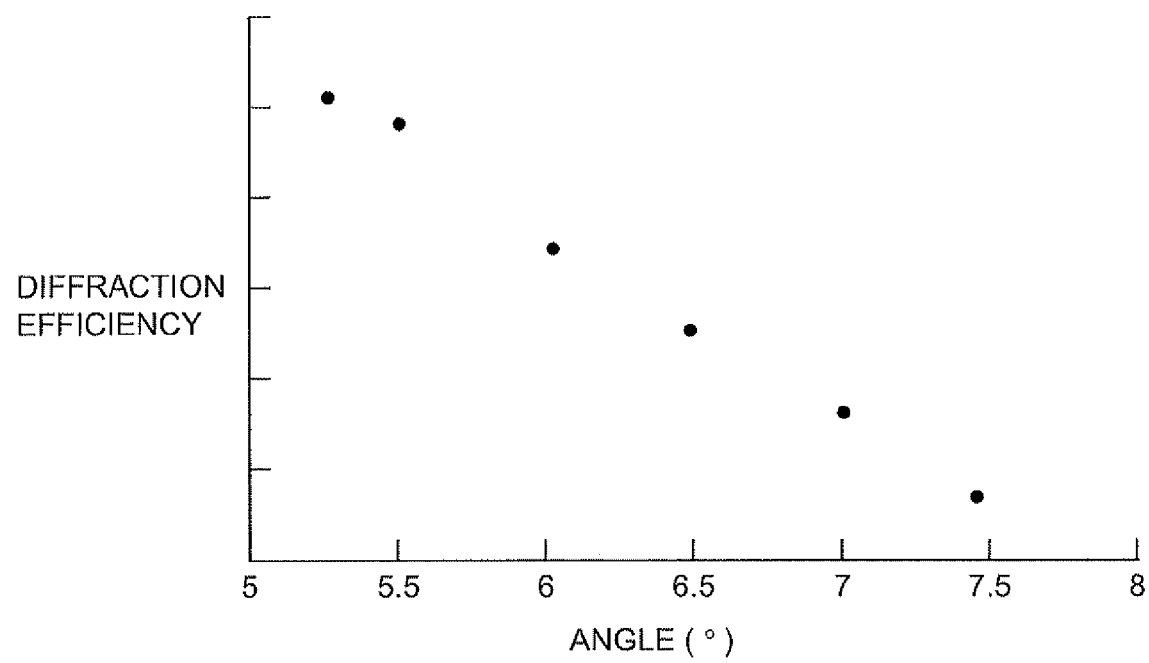
FIG. 8 is a view illustrating the relationship between an angle, which is formed by an extending line of an incident light beam and diffracted light beams, and diffraction efficiency.

FIG. 8 is a view illustrating the relationship between an angle, which is formed by an extending line of an incident light beam incident on the diffractive optical element 13R and the diffracted light beams, and the diffraction efficiency of the diffractive optical element 13R. A vertical axis of a graph indicates the diffraction efficiency with an arbitrary unit, and a horizontal axis of the graph indicates the angle formed by the extending line of the incident light beam and the diffracted light beams. The diffraction efficiency is assumed to be a value indicating the intensity of diffracted light emitted from the diffractive optical element 13R with respect to the intensity of incident light incident on the diffractive optical element 13R. The first illumination device 11R can realize high light use efficiency as the diffraction efficiency of the diffractive optical element 13R increases. In the diffractive optical element 13R, the angle formed by an extending line of an incident light beam and diffracted light beams can be appropriately determined according to the design. The diffraction efficiency of the diffractive optical element 13R decreases as the angle formed by the extending line of the incident light beam and the diffracted light beams increases from about 5° to about 7.5°. This tells that it is desirable to set the angle, which is formed by the extending line of the incident light beam and the first-order diffracted light L1, as small as possible in order that the diffractive optical element 13R makes the first-order diffracted light L1 incident on the illuminated surface S2 efficiently.

Figure 9:
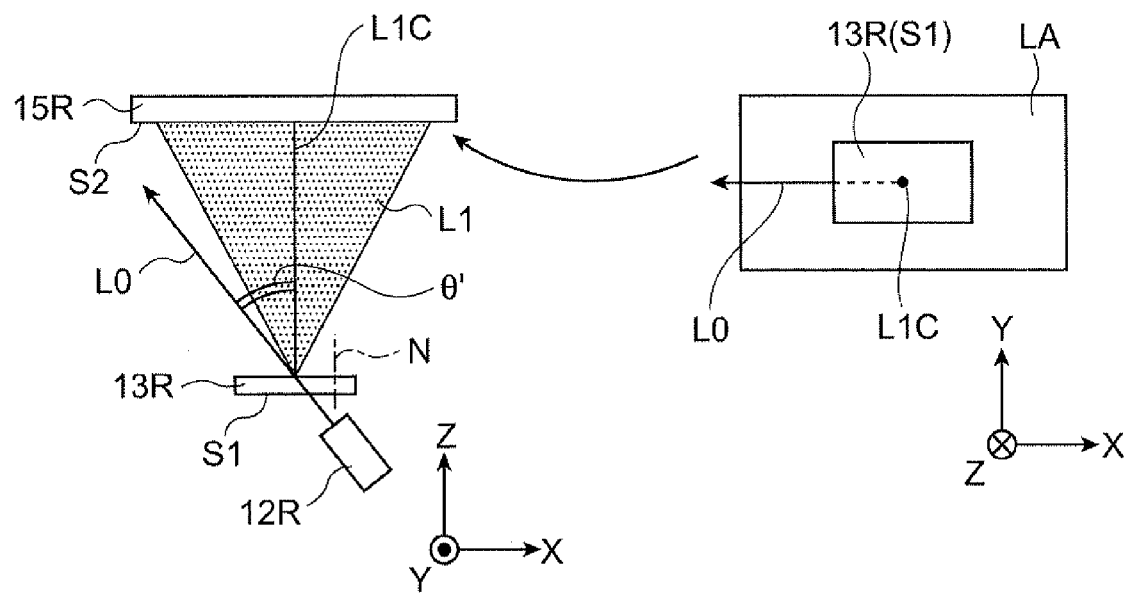
FIG. 9 is a view illustrating a case where a principal beam of laser beams is inclined in the X-axis direction with respect to a perpendicular line.
Figure 10:
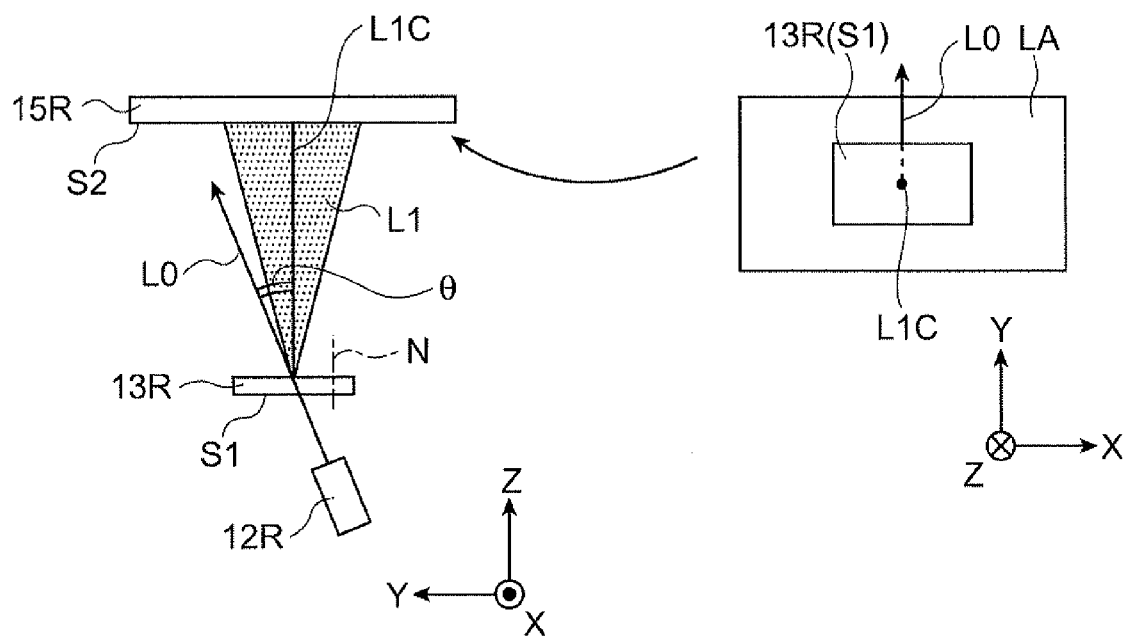
FIG. 10 is a view illustrating a case where a principal beam of laser beams is inclined in the Y-axis direction with respect to the perpendicular line.

FIGS. 9 and 10 are views illustrating the configurations desired to obtain the high diffraction efficiency in the present embodiment. In FIGS. 9 and 10, other components excluding the laser light source 12R, the diffractive optical element 13R, and first spatial light modulation device 15R are not shown. The illuminated region LA formed on the illuminated surface S2 has a rectangular shape with a short side approximately parallel to the Y axis and a long side approximately parallel to the X axis. The Y-axis direction is a specific direction along the illuminated surface S2 and is assumed to be a first direction. The X-axis direction is a direction along the illuminated surface S2 and approximately perpendicular to the Y-axis direction, which is the first direction, and is assumed to be a second direction. The illuminated region LA has a shape that is longer in the X-axis direction, which is the second direction, than in the Y-axis direction which is the first direction.

FIG. 9 is a view illustrating a case where a principal beam of laser beams incident on the diffractive optical element 13R is inclined in the X-axis direction with respect to the perpendicular line N. A left side of FIG. 9 shows the movement of the zero-order light L0 and the first-order diffracted light L1 on the XZ plane. A beam line of the zero-order light L0 emitted from the diffractive optical element 13R matches an extending line of an incident light beam incident from the laser light source 12R on the diffractive optical element 13R. A principal beam L1C of the first-order diffracted light L1 and the beam line of the zero-order light L0 form an angle θ'. A right side of FIG. 9 shows the movement of the zero-order light L0 on the XY plane.

FIG. 10 is a view illustrating a case where a principal beam of laser beams incident on the diffractive optical element 13R is inclined in the Y-axis direction with respect to the perpendicular line N. A left side of FIG. 10 shows the movement of the zero-order light L0 and the first-order diffracted light L1 on the YZ plane. A principal beam L1C of the first-order diffracted light L1 and the beam line of the zero-order light L0 form an angle θ. A right side of FIG. 10 shows the movement of the zero-order light L0 on the XY plane. When the angle θ' in FIG. 9 and the angle θ in FIG. 10 are compared, the relationship of θ'>θ is obtained.

This tells that it is desirable that a principal beam of laser beams incident on the diffractive optical element 13R be inclined in the Y-axis direction rather than the X-axis direction with respect to the perpendicular line N in order to make the diffractive optical element 13R have high diffraction efficiency. Thus, the diffraction efficiency in the diffractive optical element 13R can be increased by making the angle, which is formed by the light beam of the zero-order light L0 and the principal beam L1C of the first-order diffracted light L1, as small as possible according to the shape of the illuminated region LA. The projector 10 can realize the high light use efficiency by increasing the diffraction efficiency in the diffractive optical element 13R.

Figure 11:
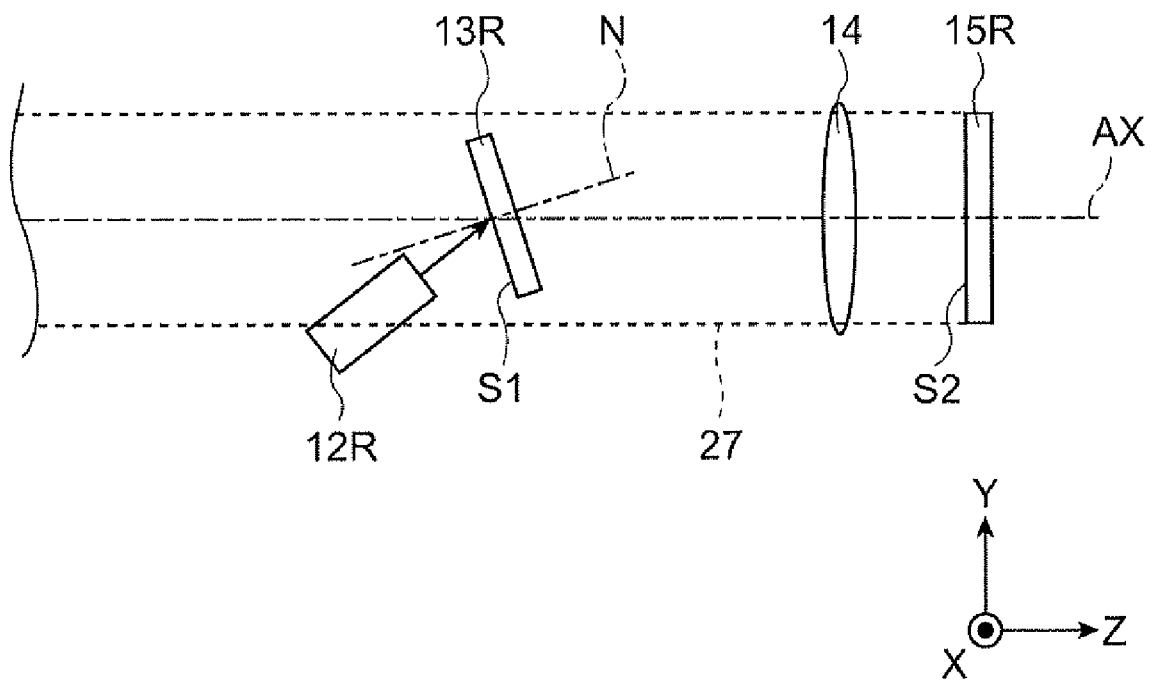
FIG. 11 is a view illustrating a case where a diffractive optical element is disposed in a state where a perpendicular line of an incidence surface is inclined with respect to an optical axis.

The diffractive optical element 13R may be disposed in another way without being limited to the case where the incidence surface S1 is perpendicular to the optical axis AX. As shown in FIG. 11, the diffractive optical element 13R may be disposed such that the incidence surface S1 is inclined with respect to the XY plane perpendicular to the optical axis AX. In this case, the perpendicular line N of the incidence surface S1 is inclined with respect to the optical axis AX. By making the angle, which is formed by the perpendicular line N of the incidence surface S1 and the optical axis AX, as small as possible, it becomes easy to perform shaping of an illuminated region and make the light intensity distribution uniform.

In addition, the diffractive optical element 13R may not be provided on the optical axis AX. The diffractive optical element 13R may be provided such that at least a part of the diffractive optical element 13R is included in a predetermined region 27 denoted by a dotted line in the drawing. In addition, it is preferable that the position on the incidence surface S1 of the diffractive optical element 13R on which a laser beam is incident be included in the predetermined region 27. The predetermined region 27 is assumed to be a space region formed by the locus of the illuminated surface S2 in moving the illuminated surface S2 in a direction parallel to the optical axis AX. When a part of the diffractive optical element 13R is included in the predetermined region 27, the projector 10 can be made compact compared with a case where the diffractive optical element 13R is disposed at the position distant from the predetermined region 27. In addition, the principal beam of the first-order diffracted light L1 emitted from the diffractive optical element 13R can be made as vertical as possible with respect to the illuminated surface S2. The laser light source 12R may be disposed at a position allowing a laser beam to travel in a state of being inclined with respect to the perpendicular line N of the incidence surface S1 of the diffractive optical elements 13R. By also disposing the laser light source 12R such that at least a part thereof is included in the predetermined region 27, the projector 10 can be made compact compared with a case where the laser light source 12R is disposed at the position distant from the predetermined region 27.

Second Embodiment

Figure 12:
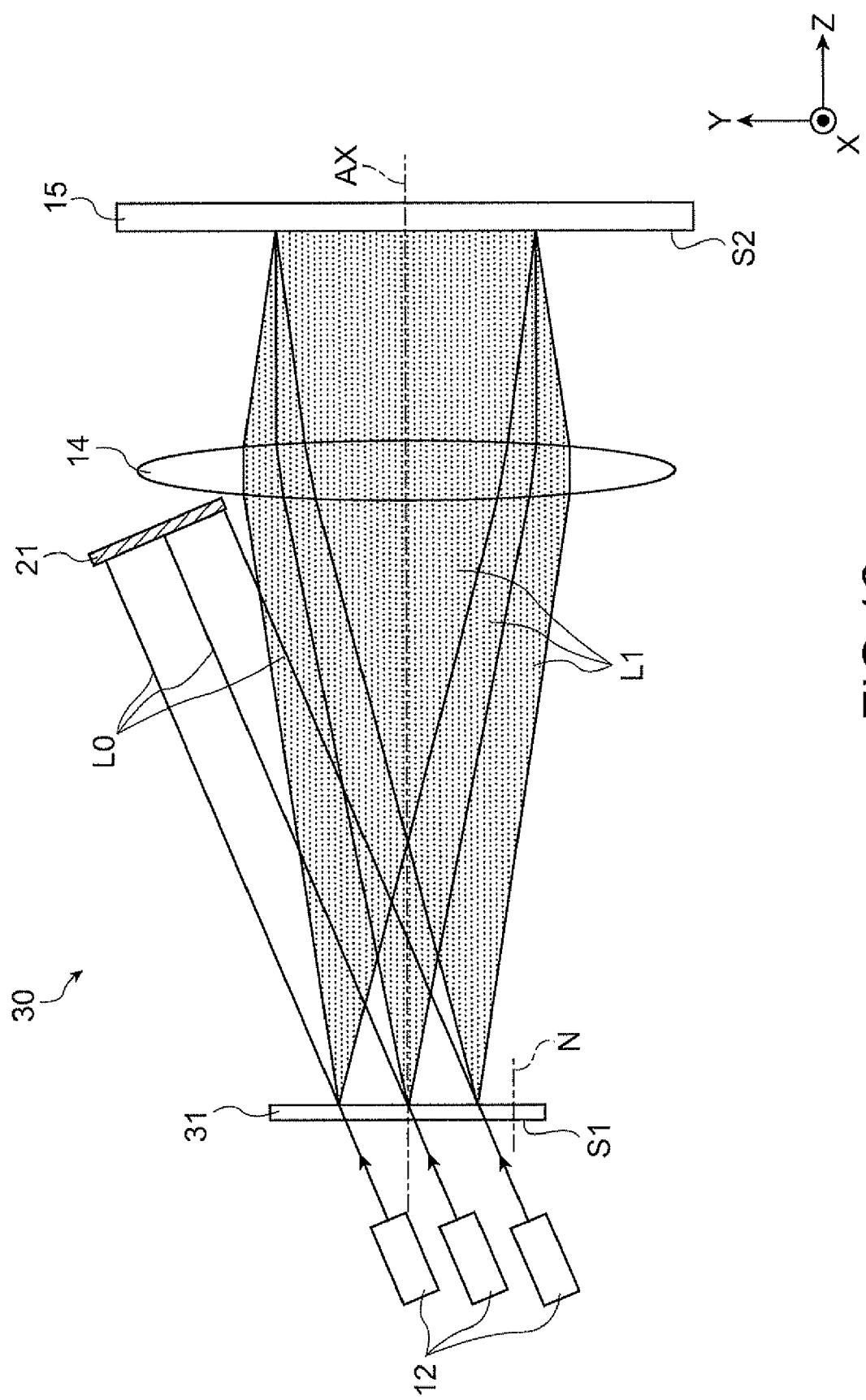
FIG. 12 is a side view schematically illustrating the configuration of an illumination device according to a second embodiment of the invention.

FIG. 12 is a side view schematically illustrating the configuration of an illumination device 30 according to a second embodiment of the invention. The illumination device 30 according to the present embodiment may be applied to the projector 10 according to the first embodiment. The same components as in the above-described embodiment are denoted by the same reference numerals, and a repeated explanation will be omitted. The illumination device 30 according to the present embodiment has three laser light sources 12. Each of the laser light sources 12 is a light source unit that emits a laser beam which is coherent light. The three laser light sources 12 are arrayed in parallel in the Y-axis direction. Each of the laser light sources 12 makes a laser beam travel in a state where the laser beam is inclined with respect to the perpendicular line N of the incidence surface S1, which is a reference plane on which a diffractive optical element 31 is disposed. The laser beams emitted from the laser light sources 12 travel approximately in parallel to each other.

The diffractive optical element 31 makes the laser beam from each laser light source 12 diffract and makes first diffracted light L1 travel to an illuminated surface S2 of a spatial light modulation device 15. The diffractive optical element 31 makes each laser beam diffract by using the diffraction grating 20 (refer to FIG. 2) provided at the position on which each laser beam is incident. The spatial light modulation device 15 is a spatial light modulation device that modulates a laser beam supplied from the illumination device 30 according to an image signal.

The diffractive optical element 31 is designed such that the first-order diffracted light components L1 generated by the laser beams emitted from the laser light sources 12 overlap on the illuminated region of the illuminated surface S2. The illumination device 30 according to the present embodiment can supply bright light using the plurality of laser light sources 12, compared with a case where one laser light source 12 is used. In addition, the diffractive optical element 31 emits zero-order light L0 that is light other than the first-order diffracted light L1. The zero-order light components L0 generated when laser beams emitted from the laser light sources 12 are incident on the diffractive optical element 31 travel approximately in parallel to be incident on a light absorbing portion 21.

In the configuration where a plurality of laser beams arrayed in parallel in the Y-axis direction are incident on the diffractive optical element 13R, a difference between focal lengths of the first-order diffracted light components L1 occurs when the diffractive optical element 13R is disposed such that the perpendicular line N is inclined in the Y-axis direction with respect to the optical axis AX, for example, as shown in FIG. 11. When the difference between the focal lengths of the first-order diffracted light components L1 occurs, it becomes difficult to make the first-order diffracted light components L1 parallel with a collimating lens 14. For this reason, in the illumination device 30 according to the present embodiment, it is desirable to dispose the diffractive optical element 13R such that the perpendicular line N is approximately parallel to the optical axis AX.

The number and arrangement of the laser light sources 12 are not limited to the case described in the present embodiment. The illumination device 30 may be configured to include a plurality of laser light sources 12 arrayed in parallel in at least one direction of the X-axis direction and the Y-axis direction.

Third Embodiment

Figure 13:
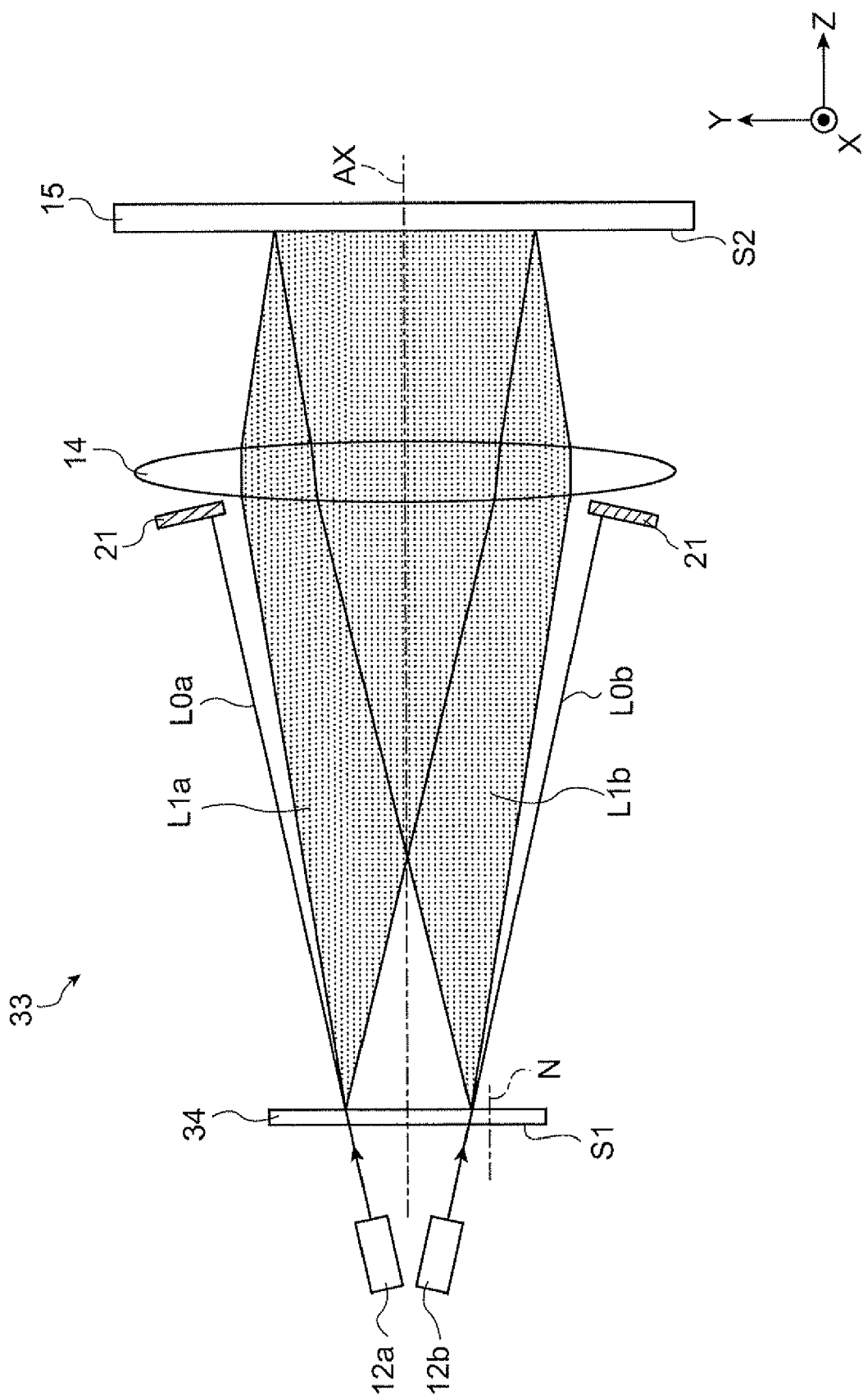
FIG. 13 is a side view schematically illustrating the configuration of an illumination device according to a third embodiment of the invention.

FIG. 13 is a side view schematically illustrating the configuration of an illumination device 33 according to a third embodiment of the invention. The illumination device 33 according to the present embodiment may be applied to the projector 10 according to the first embodiment. While laser beams are made to travel approximately in parallel from the plurality of laser light sources in the second embodiment, laser beams are made to travel in different directions from a plurality of laser light sources in the present embodiment. The same components as in the above-described embodiment are denoted by the same reference numerals, and a repeated explanation will be omitted. The illumination device 33 according to the present embodiment has a first laser light source 12a and a second laser light source 12b. The first laser Light source 12a and the second laser light source 12b are light source units that emit a laser beam which is coherent light. The first laser light source 12a and the second laser light source 12b are arrayed in parallel in the Y-axis direction.

The first laser light source 12a and the second laser light source 12b make laser beams travel approximately symmetrically with respect to the XZ plane including the optical axis AX. A laser beam from the first laser light source 12a and a laser beam from the second laser light source 12b diverge to be separated from each other in the Y-axis direction. A diffractive optical element 34 is designed such that first-order diffracted light L1a generated by the laser beam from the first laser light source 12a and first-order diffracted light L1b generated by the laser beam from the second laser light source 12b overlap each other on the illuminated region of the illuminated surface S2. Zero-order light L0a generated by the laser beam from the first laser light source 12a and zero-order light L0b generated by the laser beam from the second laser light source 12b travel approximately symmetrically with respect to the XZ plane including the optical axis AX. Light absorbing portions 21 are provided at a position on which the zero-order light L0a generated by the laser beam from the first laser light source 12a is incident and a position on which the zero-order light L0b generated by the laser beam from the second laser light source 12b is incident.

Figure 14:
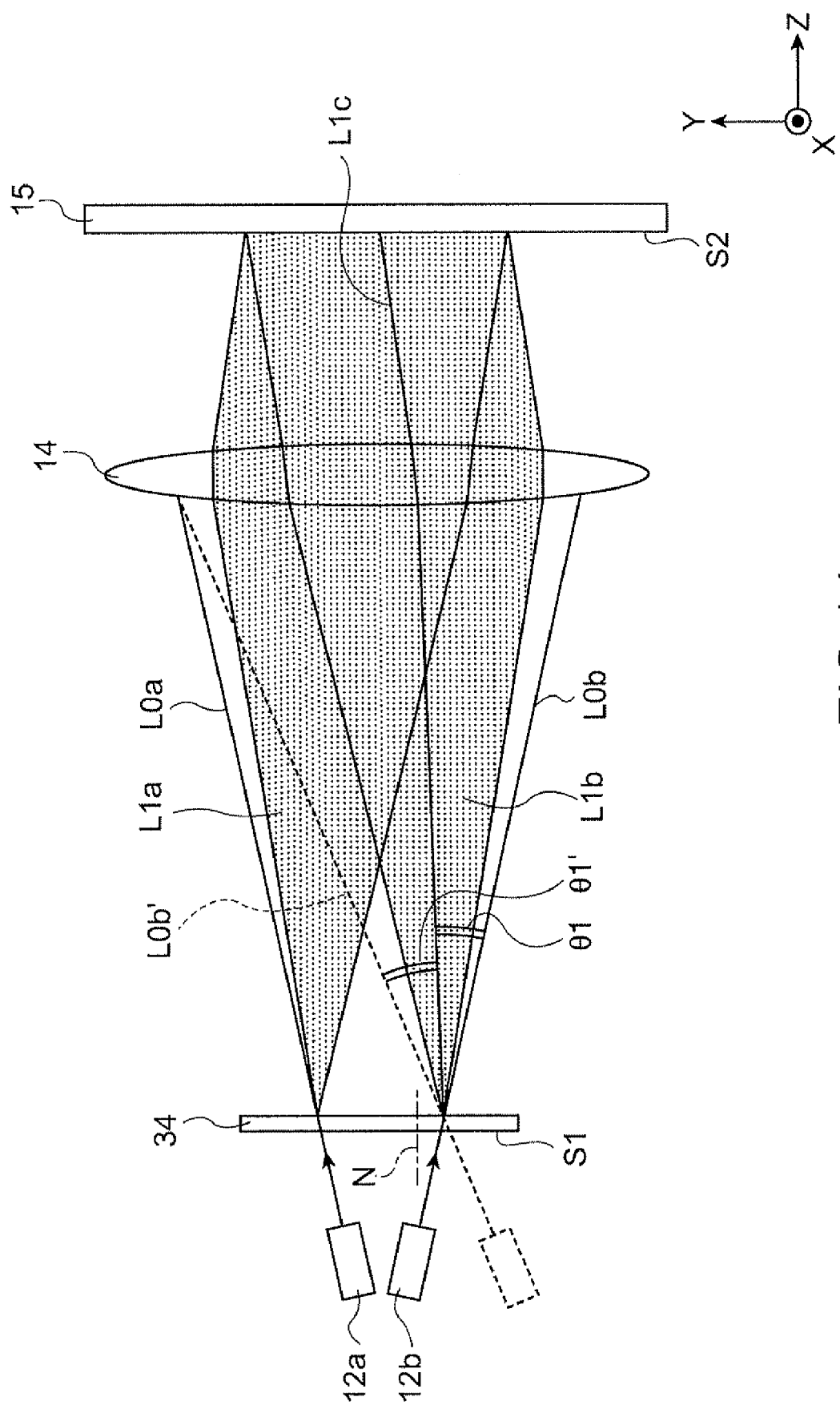
FIG. 14 is a view illustrating an advantage of making laser beams travel approximately symmetrically.

FIG. 14 is a view illustrating an advantage of making laser beams travel approximately symmetrically with respect to the XZ plane including the optical axis AX. It is assumed that a laser beam from the second laser light source 12b is made to travel in approximately the same direction as a laser beam from the first laser light source 12a, as shown by a dotted line. In this case, an angle formed by a principal beam L1C of the first-order diffracted light L1b, which is generated by the laser beam from the second laser light source 12b, and a beam line of zero-order light L0b' is assumed to be θ1'. The zero-order light L0b' generated by the laser beam from the second laser light source 12b crosses the first-order diffracted light L1a generated by the laser beam from the first laser light source 12a. The angle θ1' is set such that zero-order light L0b' completely passes through a beam flux of the first-order diffracted light L1a before the collimating lens 14.

In the case of the configuration according to the present embodiment shown by a solid line, an angle formed by the principal beam L1C of the first-order diffracted light L1b, which is generated by the laser beam from the second laser light source 12b, and a beam line of the zero-order light L0b is assumed to be θ1. In this case, the zero-order light L0b generated by the laser beam from the second laser light source 12b does not cross the first-order diffracted light L1a generated by the laser beam from the first laser light source 12a. The angle θ1 may be set smaller than the case where the zero-order light L0b passes through the beam flux of the first-order diffracted light L1a. Therefore, when the angle θ1' and the angle θ1 are compared with each other, the relationship of θ1'>θ1 is obtained.

As described above, the illumination device 33 according to the present embodiment can make the zero-order light components L0a and L0b travel to the positions other than the illuminated surface S2 and make small the angle formed by the beam line of the zero-order light L0a and the first-order diffracted light L1a and the angle formed by the beam line of the zero-order light L0b and the first-order diffracted light L1b. As described above using FIG. 8, the diffractive optical elements 34 can obtain the high diffraction efficiency by setting the angle, which is formed by the extending line of the incident light beam and the diffracted light beams, as small as possible. The diffraction efficiency in the diffractive optical element 34 can be improved by making small the angle formed by the beam line of the zero-order light L0a and the first-order diffracted light L1a and the angle formed by the beam line of the zero-order light L0b and the first-order diffracted light L1b. As a result, the high light use efficiency can be realized in the illumination device 33.

Figure 15:
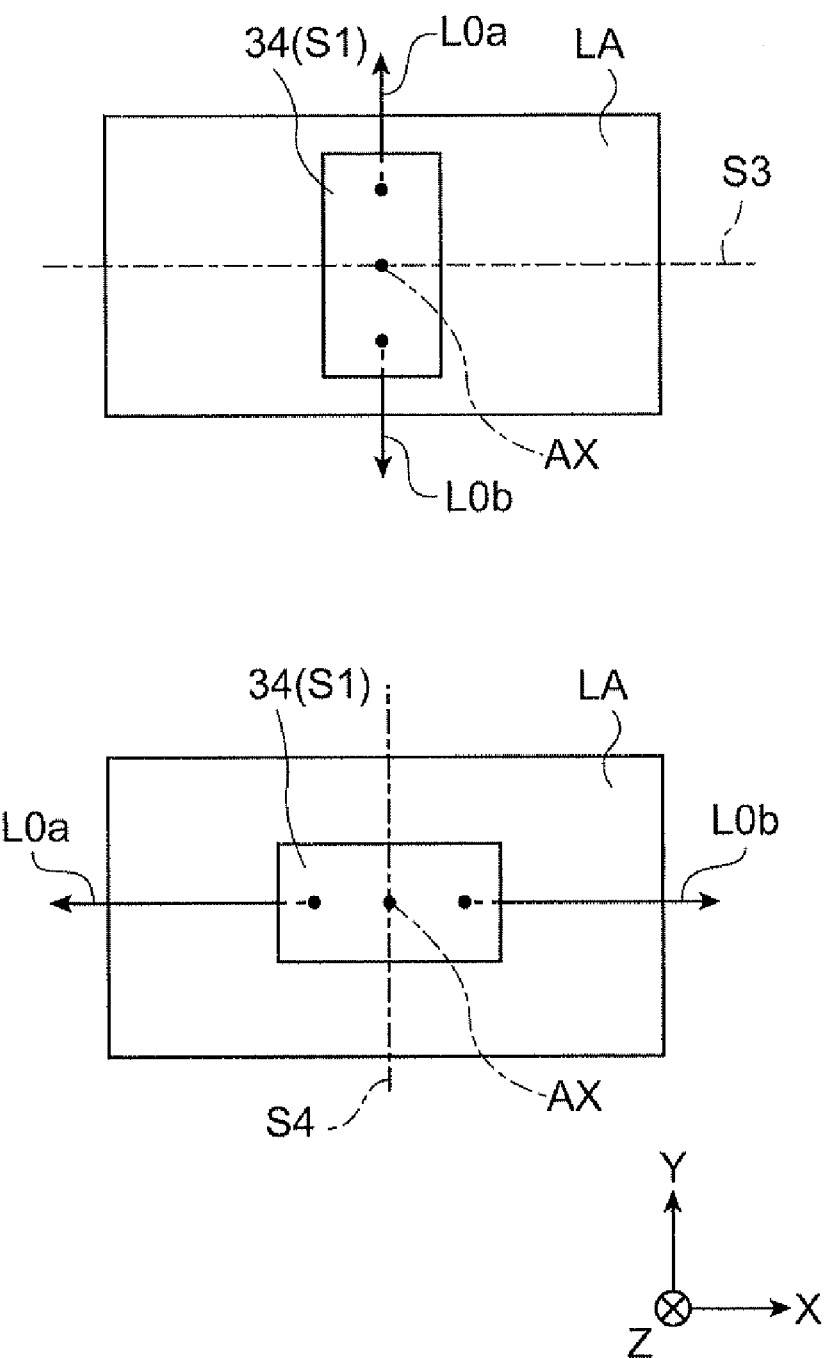
FIG. 15 is a view illustrating a first modification of the third embodiment.

FIG. 15 is a view illustrating a first modification of the present embodiment. The illuminated region LA formed on the illuminated surface S2 has a rectangular shape with a short side approximately parallel to the Y axis and a long side approximately parallel to the X axis. The illuminated region LA has a shape that is longer in the X-axis direction, which is a second direction, than in the Y-axis direction which is a first direction.

An upper part of FIG. 15 shows the movements of the zero-order light components L0a and L0b on the XY plane when the first laser light source 12a and the second laser light source 12b make laser beams travel approximately symmetrically with respect to an XZ plane S3 including the optical axis AX. The configuration is applied to the illumination device 33 according to the present embodiment. A lower part of FIG. 15 shows the configuration of an illumination device in this modification. The illumination device in this modification makes laser beams travel approximately symmetrically with respect to a YZ plane S4 including the optical axis AX using the first laser light source 12a and the second laser light source 12b. The illumination device may have any of the configurations shown.

Also in the diffractive optical element 34, it becomes possible to obtain the high diffraction efficiency by making a principal beam of laser beams incident on the diffractive optical element 34 inclined in the Y-axis direction rather than the X-axis direction with respect to the perpendicular line N, similar to the case of the first embodiment described using FIGS. 9 and 10. Accordingly, also in the present embodiment, the higher diffraction efficiency can be obtained in the case of the configuration shown in the upper part of FIG. 15 compared with the case of the configuration shown in the lower part of FIG. 15.

Figure 16:
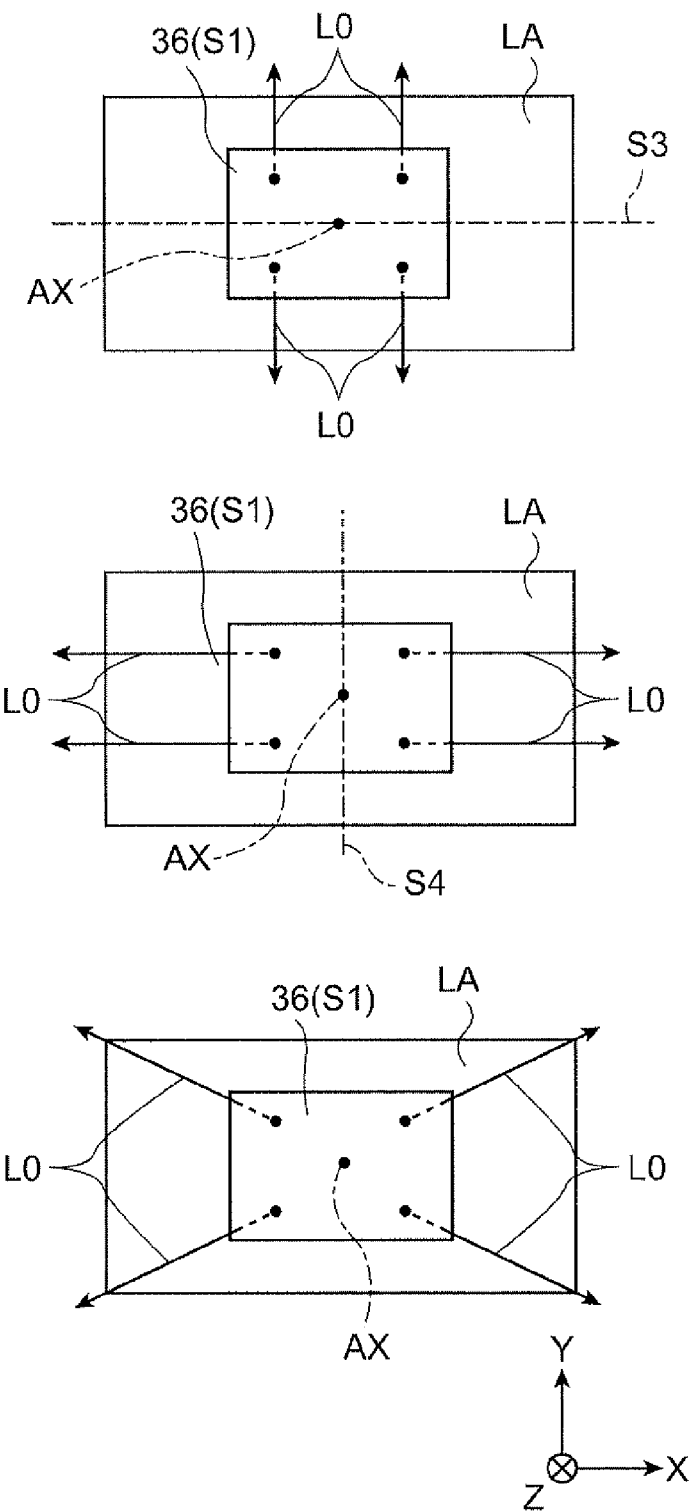
FIG. 16 is a view illustrating a second modification of the third embodiment.

FIG. 16 is a view illustrating a second modification of the present embodiment. An illumination device in this modification has four laser light sources. The four laser light sources are disposed by positioning two of the laser light sources in parallel in the X-axis direction and positioning the other two laser light sources in parallel in the Y-axis direction. The diffractive optical element 36 is designed such that first-order diffracted light components generated by laser beams emitted from the laser light sources overlap on the illuminated region LA of the illuminated surface S2.

An upper part of FIG. 16 shows the movements of the zero-order light components L0 on the XY plane when the laser light sources make laser beams travel approximately symmetrically with respect to the XZ plane S3 including the optical axis AX. A middle part of FIG. 16 shows the movements of the zero-order light components L0 on the XY plane when the laser light sources make laser beams travel approximately symmetrically with respect to the YZ plane S4 including the optical axis AX. A lower part of FIG. 16 shows the movements of the zero-order light components L0 on the XY plane when the laser light sources make laser beams travel approximately symmetrically with respect to the optical axis AX. The illumination device in this modification may have any of the configurations shown.

The angle formed by a beam line of the zero-order light L0 and a principal beam of the first-order diffracted light L1 is smallest in the upper part and largest in the lower part of FIG. 16. In this modification, the higher diffraction efficiency is obtained in the order of the configuration shown in the upper part, the configuration shown in the middle part, and the configuration shown in the lower part of FIG. 16. In addition, it is assumed that the degree of the diffraction efficiency of the diffractive optical elements 34 and 36 described in the present embodiment may change according to the shape of a reproduced image obtained by the diffractive optical elements 34 and 36. The illumination device according to the present embodiment is preferably configured to make laser beams travel approximately symmetrically with respect to the optical axis AX or a plane including the optical axis AX. The number or arrangement of laser light sources may be suitably changed.

Fourth Embodiment

Figure 17:
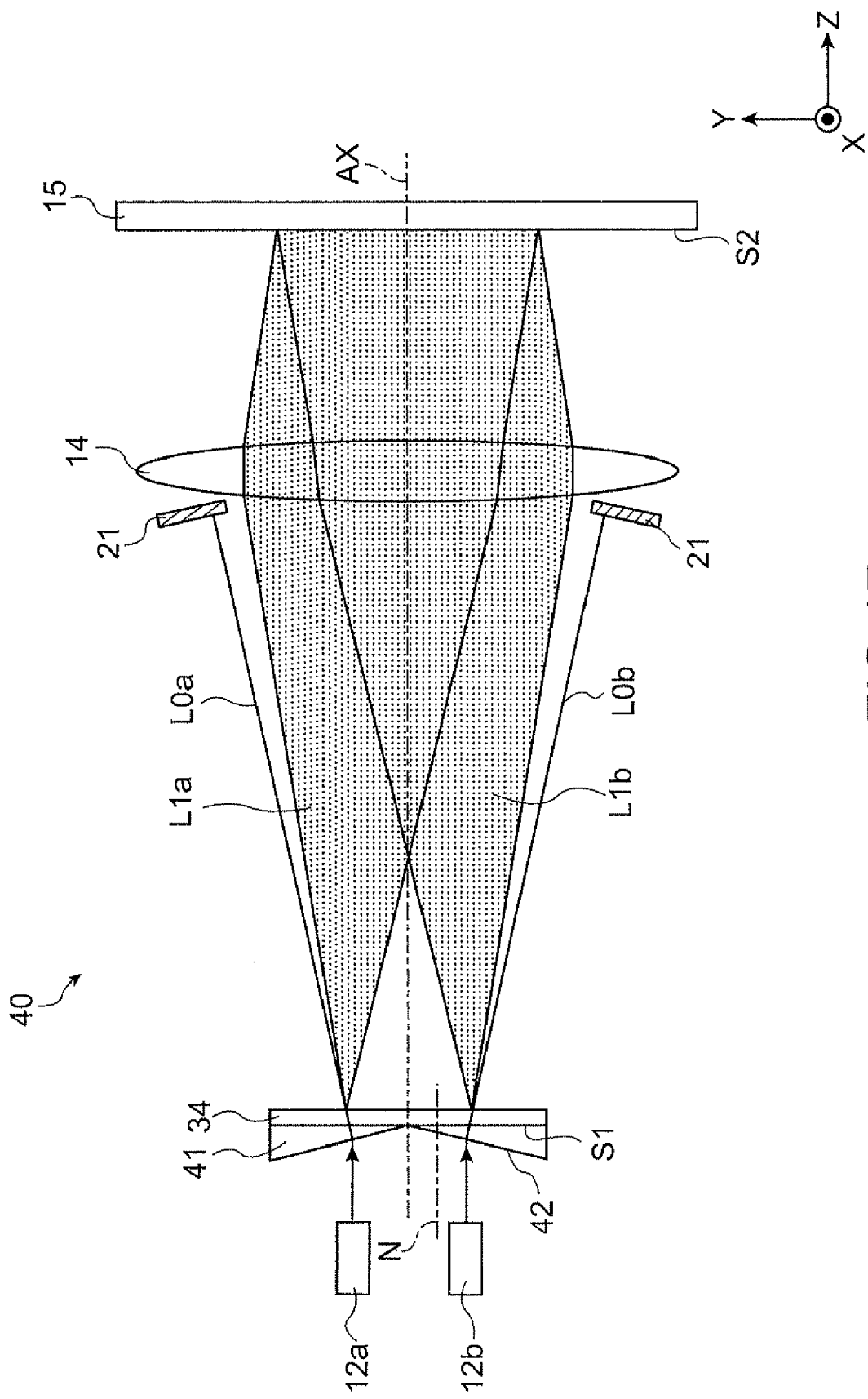
FIG. 17 is a side view schematically illustrating the configuration of an illumination device according to a fourth embodiment of the invention.

FIG. 17 is a side view schematically illustrating the configuration of an illumination device 40 according to a fourth embodiment of the invention. The illumination device 40 according to the present embodiment may be applied to the projector 10 according to the first embodiment. The same components as in the above-described embodiment are denoted by the same reference numerals, and a repeated explanation will be omitted. The illumination device 40 according to the present embodiment has a prism 41. The prism 41 functions as a deflection element that makes laser beams emitted from the first laser light source la and the second laser light source 12b deflected and the deflected laser beams incident on the diffractive optical element 34.

Both the first laser light source 12a and the second laser light source 12b make laser beams travel approximately in parallel to the perpendicular line N of the incidence surface S1, which is a reference plane on which the diffractive optical element 34 is disposed. The prism 41 is disposed on the incidence surface S1 of the diffractive optical element 34. The prism 41 is formed by using a transparent member. The prism 41 has an interface 42 provided to be inclined with respect to the incidence surface S1. The prism 41 makes a laser beam deflected by refracting the laser beam on the interface 42. Laser beams from the first laser light source 12a and the second laser light source 12b travel approximately symmetrically with respect to the XZ plane including the optical axis AX by deflection using the prism 41. A laser beam transmitted through the prism 41 is incident on the diffractive optical element 34.

Also in the present embodiment, the high diffraction efficiency can be obtained by making laser beams travel approximately symmetrically with respect to the XZ plane including the optical axis AX, similar to the illumination device according to the third embodiment. In the illumination device 40 according to the present embodiment, a laser beam traveling in a state of being inclined with respect to the perpendicular line N of the incidence surface S1 can be incident on the diffractive optical element 34 by suitably deflecting the laser beam with the prism 41. In the illumination device 40, the laser light sources 12a and 12b can be disposed with high degree of freedom by using the prism 41. It is preferable that the prism 41 can suitably deflect a laser beam, and the prism 41 may have any shape. The prism 41 may also be disposed to be spaced apart from the incidence surface S1 of the diffractive optical element 34 without being limited to the case of being disposed on the incidence surface S1 of the diffractive optical element 34.

Figure 18:
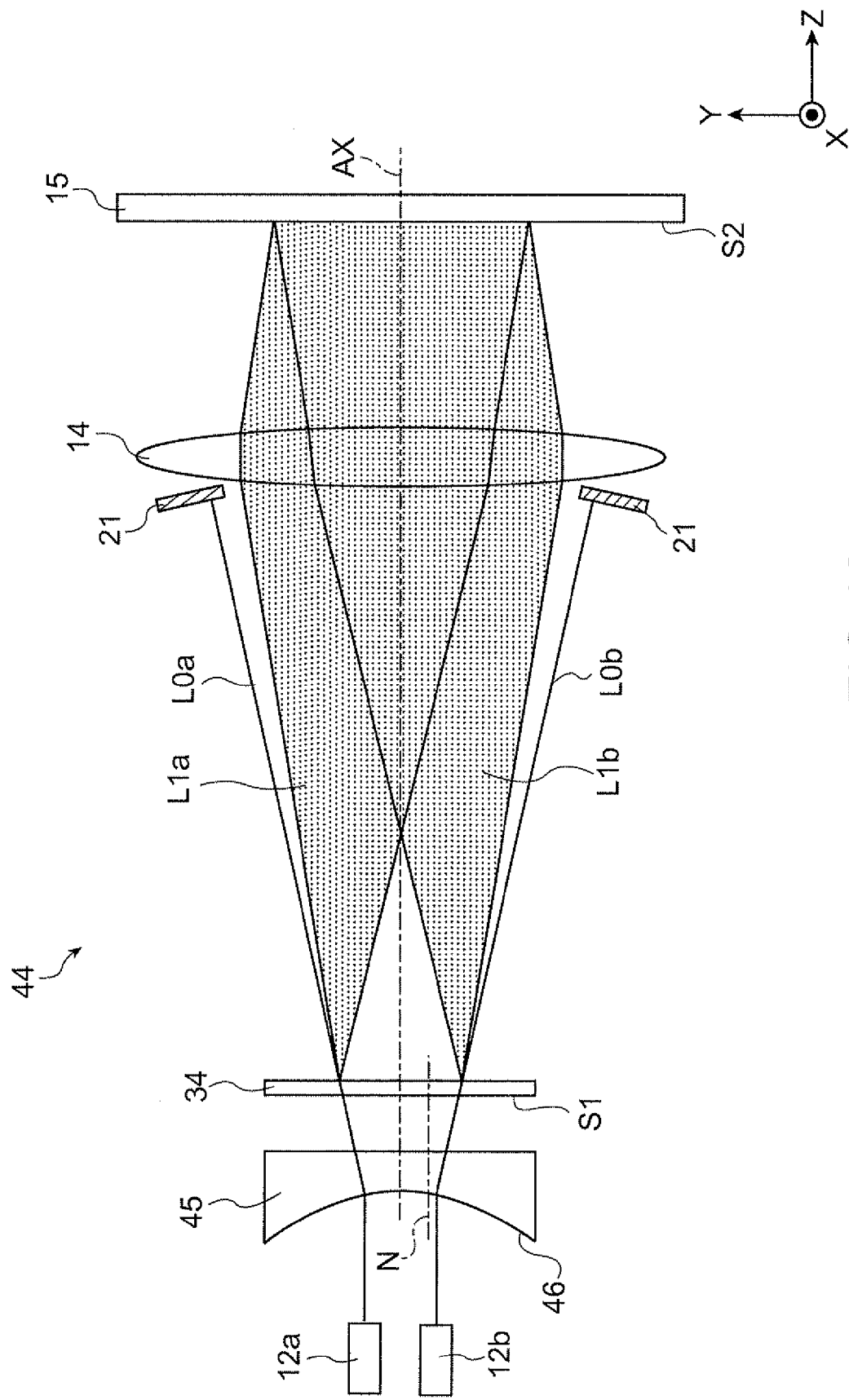
FIG. 18 is a side view schematically illustrating the configuration of an illumination device according to a first modification of the fourth embodiment.

FIG. 18 is a side view schematically illustrating the configuration of an illumination device 44 according to a first modification of the present embodiment. The illumination device 44 in this modification is characterized in that a concave lens 45 functioning as a deflection element is provided. The concave lens 45 is provided in the middle of an optical path between the first laser light source 12a and the second laser light source 12b and the diffractive optical element 34. The concave lens 45 has a concave surface 46 with a concave shape. The concave lens 45 deflects a laser beam by refracting the laser beam on the concave surface 46. Also in this modification, the laser light sources 12a and 12b may be disposed with high degree of freedom. In addition, the concave lens 45 may be provided on the incidence surface S1 of the diffractive optical element 34.

Figure 19:
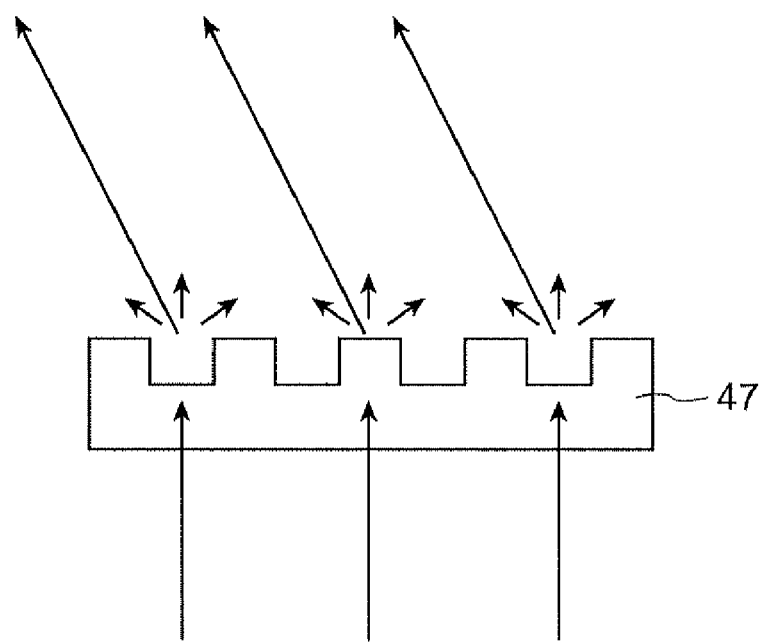
FIG. 19 is a view illustrating a diffraction grating used as a deflection element.
Figure 20:
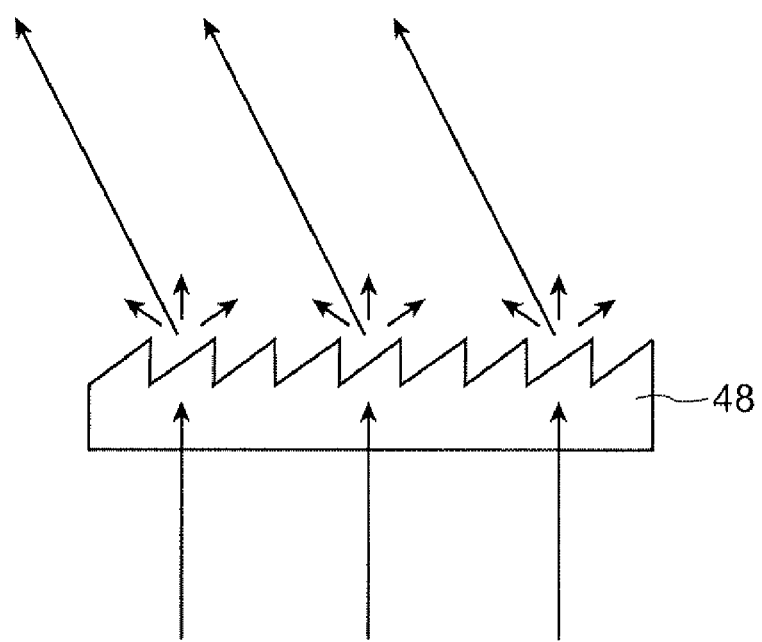
FIG. 20 is a view illustrating a blaze grating used as a deflection element.

Not only the prism 41 or the concave lens 45 but also a gradient index lens with refractive index distribution, a field optical element that changes the refractive index distribution according to the electric field, and the like may also be used as a deflection element that refracts a laser beam. The deflection element is not limited to the case of refracting a laser beam. The deflection element may be made to diffract a laser beam. For example, a diffraction grating 47 shown in FIG. 19 may be used as the deflection element that diffracts a laser beam. It is preferable that the diffraction grating 47 can deflect light by diffraction. The diffraction grating 47 has a fine binary structure, for example. The fine binary structure is a fine structure in which a convex portion formed to have an approximately fixed height and a concave portion formed to have an approximately fixed height are alternately formed. Alternatively, a blaze grating 48 shown in FIG. 20 may be used as the deflection element that diffracts a laser beam. As the deflection element, a Fresnel lens may be used.

Figure 21:
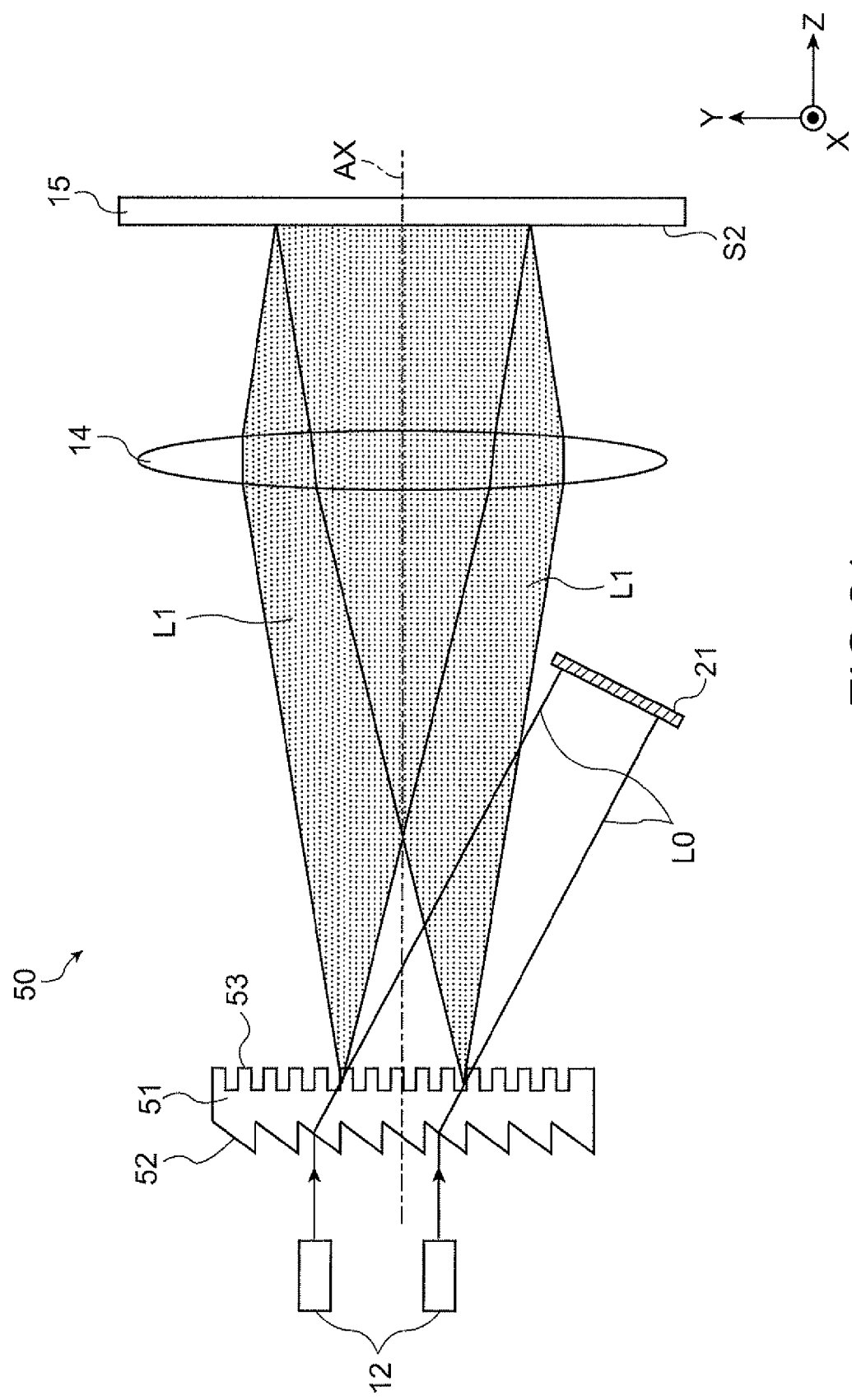
FIG. 21 is a side view schematically illustrating the configuration of an illumination device according to a second modification of the fourth embodiment.

FIG. 21 is a side view schematically illustrating the configuration of an illumination device 50 according to a second modification of the present embodiment. The illumination device 50 in this modification is characterized in that an optical element 51, in which a blaze grating 52 and a diffraction grating 53 are integrally formed, is provided. The optical element 51 is provided at the position on which a laser beam emitted from the laser light source 12 is incident. The optical element 51 is formed by using a transparent member. The blaze grating 52 is formed on an incidence surface of the optical element 51 on which a laser beam from the laser light source 12 is incident. The blaze grating 52 functions as a deflection element that diffracts a laser beam.

The diffraction grating 53 is formed on an emission surface of the optical element 51 from which light from the blaze grating 52 is emitted. The diffraction grating 53 functions as a diffractive optical element that diffracts a laser beam from the blaze grating 52 and makes the first-order diffracted light L1 travel to the illuminated surface S2. The diffraction grating 53 is designed such that the first-order diffracted light components L1 generated by incidence of laser beams from the blaze grating 52 overlap on the illuminated region of the illuminated surface S2. In addition, the zero-order light components L0 generated when laser beams from the blaze grating 52 are incident on the diffraction grating 53 travel approximately in parallel to be incident on the light absorbing portion 21.

By using the optical element 51 in which the blaze grating 52 and the diffraction grating 53 are integrally formed, the number of components of the illumination device 50 can be reduced. As a result, the illumination device 50 can be made simple and compact. Also in the illumination device 40 shown in FIG. 17, the illumination device 40 can be made simple and compact by adopting a configuration in which the prism 41 is provided on the incidence surface S1 of the diffractive optical element 34, similar to this modification. In the optical element 51, a diffraction grating having a fine binary structure, a prism or a concave lens that refracts light, and the like may also be provided instead of the blaze grating 52.

The optical element 51 may be suitably modified without being not limited to the case where a structure functioning as a deflection element is formed on the incidence surface of the optical element 51 and a structure functioning as a diffractive optical element is formed on the emission surface of the optical element 51. For example, the structure functioning as a deflection element may be formed inside the optical element 51. Each illumination device according to the present embodiment is preferably configured to deflect laser beams from one or a plurality of laser light sources using the deflection element. In addition, the number or arrangement of laser light sources may be suitably changed.

Fifth Embodiment

Figure 22:
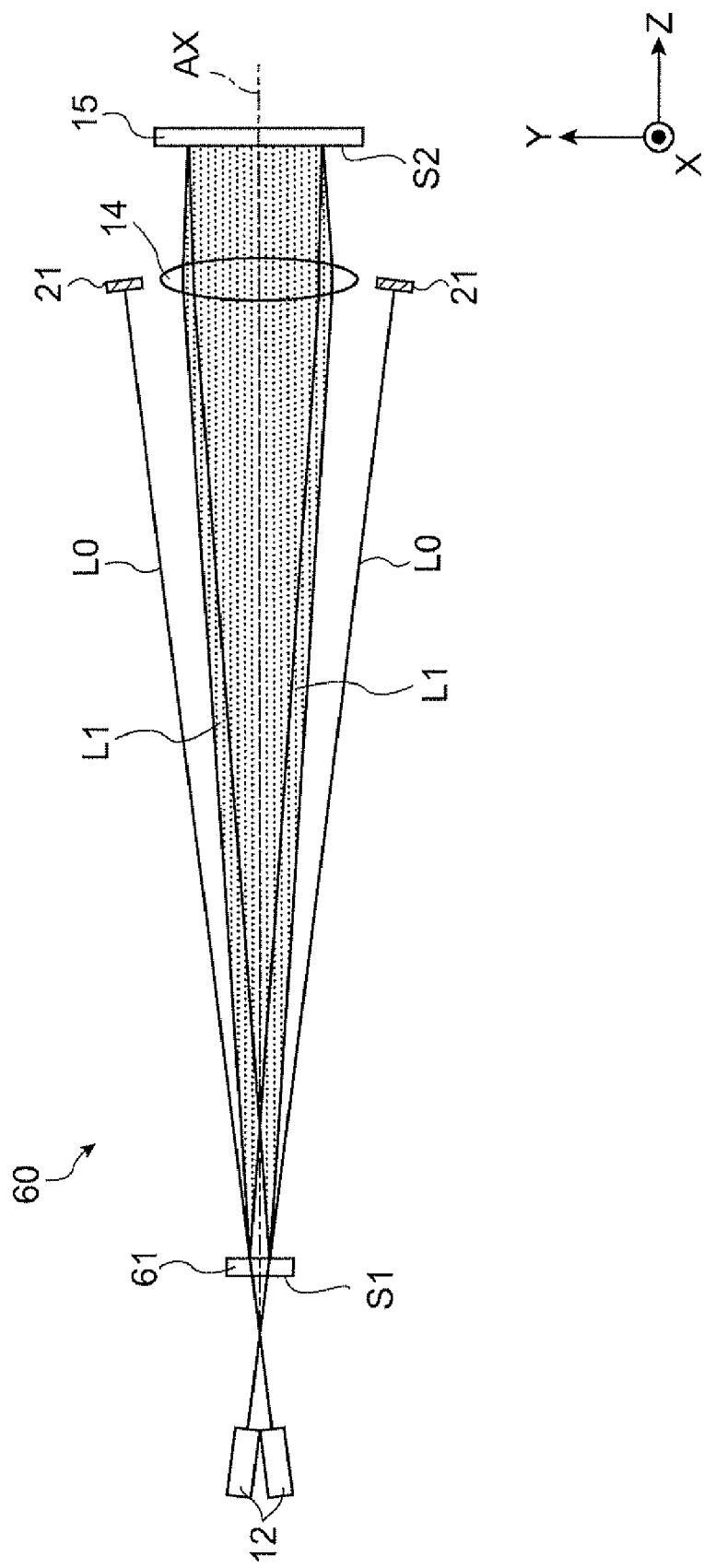
FIG. 22 is a side view schematically illustrating the configuration of an illumination device according to a fifth embodiment of the invention.

FIG. 22 is a side view schematically illustrating the configuration of an illumination device 60 according to a fifth embodiment of the invention. The illumination device 60 according to the present embodiment may be applied to the projector 10 according to the first embodiment. The illumination device 60 according to the present embodiment is characterized in that principal beams of laser beams emitted from the laser light source 12 are closest in an optical path between the laser light source 12 and a diffractive optical element 61. The same components as in the above-described embodiment are denoted by the same reference numerals, and a repeated explanation will be omitted.

The illumination device 60 has two laser light sources 12. Each of the laser light sources 12 makes laser beams travel approximately symmetrically with respect to the XZ plane including the optical axis AX. The laser beams from each laser light source 12 converge to be close to each other in the Y-axis direction and cross each other in the optical path between the laser light sources 12 and the diffractive optical element 61. After crossing in the optical path between the laser light sources 12 and the diffractive optical element 61, the laser beams are emitted to be separated from each other in the Y-axis direction. The laser beams are incident on the positions, which are different in the Y-axis direction, of the incidence surface S1 of the diffractive optical element 61.

The diffractive optical element 61 is designed such that the first-order diffracted light components L1 generated by incidence of laser beams from the laser light sources 12 overlap on the illuminated region of the illuminated surface S2. The zero-order light L0 generated by the laser beam from each laser light source 12 is incident on each light absorbing portion 21. Also in the present embodiment, the diffraction efficiency in the diffractive optical element 61 can be improved by making small the angle formed by a beam line of the zero-order light L0 and the first-order diffracted light L1, similar to the case of the illumination device 33 (refer to FIG. 13) according to the third embodiment. As a result, the high light use efficiency can be realized.

By making laser beams converging between the laser light sources 12 and the diffractive optical element 61 incident on the diffractive optical element 61, it becomes possible to use the diffractive optical element 61 with the small incidence surface S1 compared with the case where laser beams diverging from each laser light source 12 is incident on the diffractive optical element 61. Since this makes it possible to make the diffractive optical element 61 small, manufacturing time and cost of the diffractive optical element 61 can be reduced. For example, when the laser light sources 12 are large and it is not possible to make the emission positions of the laser light sources 12 dense, the diffractive optical element 61 may have no choice but to be made large in order to make laser beams travel in parallel or diverge. The illumination device 60 according to the present embodiment is useful in the case where the laser light sources 12 are large since the diffractive optical element 61 can be made small by making laser beams converge. In addition, the illumination device 60 is preferably configured such that principal beams of laser beams are closest in the optical path between the laser light sources 12 and the diffractive optical element 61, and is not limited to having the configuration in which the laser beams cross each other in the optical path between the laser light sources 12 and the diffractive optical element 61.

Figure 23:
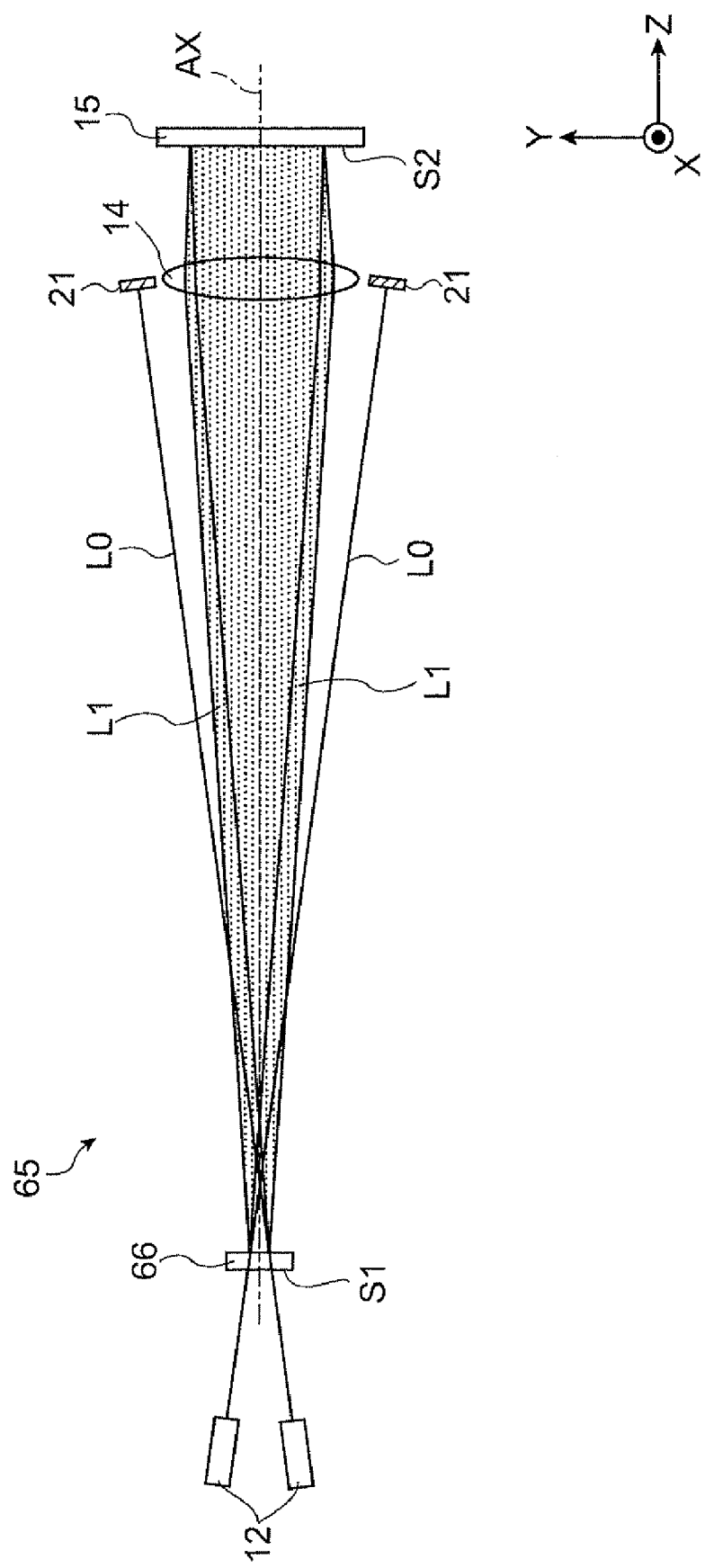
FIG. 23 is a side view schematically illustrating the configuration of an illumination device according to a modification of the fifth embodiment.

FIG. 23 is a side view schematically illustrating the configuration of an illumination device 65 according to a modification of the present embodiment. The illumination device 65 in this modification is characterized in that principal beams of the zero-order light L0 emitted from a diffractive optical element 66 are closest in an optical path between the diffractive optical element 66 and the illuminated surface S2. Laser beams emitted from the laser light sources 12 converge to be close to each other in the Y-axis direction. The laser beams are incident on the positions, which are different in the Y-axis direction, of the incidence surface S1 of the diffractive optical element 66. The diffractive optical element 66 is designed such that the first-order diffracted light components L1 generated by incidence of laser beams from the laser light sources 12 overlap on the illuminated region of the illuminated surface S2.

The zero-order light components L0 generated by the laser beams from the laser light sources 12 travel on extending lines of beam lines of the laser beams incident on the diffractive optical element 66 and cross in an optical path between the diffractive optical element 66 and the illuminated surface S2. After crossing in the optical path between the diffractive optical element 66 and the illuminated surface S2, the zero-order light components L0 diverge to be separated from each other in the Y-axis direction and are incident on the light absorbing portions 21. Also in this modification, the diffractive optical element 66 can be made small by making laser beams converging between the laser light sources 12 and the diffractive optical element 66 incident on the diffractive optical element 66. As a result, manufacturing time and cost of the diffractive optical element 66 can be reduced. In addition, since the distance between the laser light source 12 and the diffractive optical element 66 can be shortened compared with the illumination device 60 (refer to FIG. 22), the illumination device 65 can be made small. In addition, the illumination device 65 is preferably configured such that principal beams of the zero-order light components are closest in the optical path between the diffractive optical element 66 and the illuminated surface S2, and is not limited to having the configuration in which the zero-order light components cross each other in the optical path between the diffractive optical element 66 and the illuminated surface S2.

In both the illumination devices 60 and 65 according to the present embodiment, it is requested that laser beams be incident on different positions of the incidence surface S1 of each of the diffractive optical elements 61 and 66. By adopting the configuration in which laser beams are incident on the incidence surface S1 so as to be positioned as close as possible, it becomes possible to make the diffractive optical elements 61 and 66 as small as possible.

Furthermore, the illumination device according to each of the embodiments is not limited to the case of using a laser light source having a semiconductor laser, but a laser light source having a solid-state laser, a liquid laser, or a gas laser may also be used. The illumination device is not limited to the case of using a laser light source as a light source unit. The illumination device may be configured to use a solid-state light source, such as a light-emitting diode (LED) or a superluminescent diode (SLD), as a light source unit. The projector according to the embodiment of the invention is not limited to the case in which a transmissive liquid crystal display device is used as a spatial light modulation device. For example, a liquid crystal on silicon (LCOS), a digital micromirror device (DMD), and a grating light valve (GLV) may also be used as the spatial light modulation device. The projector is not limited to having the configuration in which a spatial light modulation device is provided for every color light component. The projector may also be configured to modulate two or three or more color light components with one spatial light modulation device. The projector is not limited to the case of using the spatial light modulation device. The projector may also be a slide projector using slides with image information. The projector may also be a so-called rear projector that supplies light onto one surface of a screen and makes the light emitted from the other surface of the screen observed so that a viewer can enjoy an image.

The illumination devices according to the embodiments of the invention may be applied not only to the image display device but also to an electronic apparatus, such as a monitor apparatus that images a subject illuminated by using light from the illumination device. In addition, the illumination devices according to the embodiments of the invention may be used in an optical system, such as a laser machining apparatus or an exposure apparatus for exposure using a laser beam.

As described above, the illumination devices according to the embodiments of the invention are suitable for a case of being used in an image display device, such as a projector.

The entire disclosure of Japanese Patent Application No. 2008-000372, filed Jan. 7, 2008 is expressly incorporated by reference herein.

What is claimed is:

1. An illumination device comprising:
   a light source unit that emits coherent light; and
   a diffractive optical element that diffracts the coherent light emitted from the light source unit and makes the diffracted light travel to an illuminated surface,
   wherein the diffractive optical element is disposed such that the coherent light enters the diffractive optical element in a state of being inclined with respect to a perpendicular line of a reference plane on which the diffractive optical element is disposed, and
   zero-order light, which is light other than the diffracted light, of light components emitted from the diffractive optical element travels to a position other than the illuminated surface.

2. The illumination device according to claim 1,
   wherein when the illuminated surface is moved in a direction parallel to an optical axis of an illumination optical system that forms the illumination device, at least a part of the diffractive optical element is included in a predetermined region assuming that a space region formed by the locus of the illuminated surface is the predetermined region.

3. The illumination device according to claim 2,
   wherein the reference plane is approximately perpendicular to the optical axis.

4. The illumination device according to claim 1, further comprising:
   a collimating lens that collimates the diffracted light components from the diffractive optical element to travel to the illuminated surface.

5. The illumination device according to claim 1,
   wherein assuming that a specific direction along the illuminated surface is a first direction and a direction along the illuminated surface and approximately perpendicular to the first direction is a second direction, an illuminated region, which is a region on which the diffracted light is incident, of the illuminated surface forms a shape longer in the second direction than in the first direction, and a principal beam of the coherent light incident on the diffractive optical element is inclined in the first direction with respect to the perpendicular line.

6. The illumination device according to claim 1, further comprising:
   a plurality of the light source units.

7. The illumination device according to claim 6,
   wherein the plurality of light source units make the coherent light travel approximately symmetrically with respect to an optical axis of an illumination optical system that forms the illumination device or a plane including the optical axis.

8. The illumination device according to claim 6,
   wherein principal beams of the coherent light emitted from the light source units are closest in an optical path between the light source units and the diffractive optical element.

9. The illumination device according to claim 6, wherein principal beams of the zero-order light emitted from the diffractive optical element are closest in an optical path between the diffractive optical element and the illuminated surface.

10. The illumination device according to claim 1, further comprising:
a deflection element that deflects the coherent light emitted from the light source unit and makes the deflected light incident on the diffractive optical element.

11. The illumination device according to claim 10, wherein the deflection element refracts the coherent light.

12. The illumination device according to claim 10, wherein the deflection element diffracts the coherent light.

13. The illumination device according to claim 10, wherein the deflection element and the diffractive optical element are integrally formed.

14. An image display device that displays an image using light supplied from the illumination device according to claim 1.

15. A projector comprising:
the illumination device according to claim 1;
a spatial light modulation device that modulates light supplied from the illumination device according to an image signal; and
a projection optical system that projects light emitted from the spatial light modulation device.

16. The illumination device of claim 1, wherein the diffractive optical element comprises an integrally-formed blaze grating and diffraction grating, wherein the coherent light is incident on the blaze grating.

* * * * *